United States Patent
Boyd et al.

(10) Patent No.: US 11,531,737 B1
(45) Date of Patent: Dec. 20, 2022

(54) BIOMETRIC IDENTITY DISAMBIGUATION

(71) Applicant: The Government of the United States of America, as represented by the Secretary of Homeland Security, Washington, DC (US)

(72) Inventors: Daniel Boyd, Arlington, VA (US); Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 354 days.

(21) Appl. No.: 16/594,891

(22) Filed: Oct. 7, 2019

Related U.S. Application Data

(63) Continuation-in-part of application No. 15/223,172, filed on Jul. 29, 2016.

(60) Provisional application No. 62/741,869, filed on Oct. 5, 2018, provisional application No. 62/221,436, filed on Sep. 21, 2015, provisional application No. 62/198,776, filed on Jul. 30, 2015.

(51) Int. Cl.
*G06F 21/32* (2013.01)
*G06F 16/2455* (2019.01)

(52) U.S. Cl.
CPC .......... *G06F 21/32* (2013.01); *G06F 16/2455* (2019.01)

(58) Field of Classification Search
CPC .............................. G06F 21/32; G06F 16/2455
See application file for complete search history.

(56) References Cited

U.S. PATENT DOCUMENTS

| | | | |
|---|---|---|---|
| 6,085,976 A | 7/2000 | Seher | |
| 7,689,834 B2 | 3/2010 | Igarashi | |
| 8,392,721 B2 | 3/2013 | Kaleedhass et al. | |
| 8,533,485 B1 | 9/2013 | Bansal et al. | |
| 8,677,139 B1 * | 3/2014 | Kalocsai | G06F 21/32 |
| | | | 713/186 |
| 8,823,497 B2 | 9/2014 | Hutzler et al. | |
| 8,866,586 B2 | 10/2014 | Hayashi | |
| 9,560,165 B2 * | 1/2017 | Liu | H04L 67/06 |
| 10,055,733 B2 | 8/2018 | Hanna | |
| 10,097,545 B2 | 10/2018 | Cartaya | |

(Continued)

FOREIGN PATENT DOCUMENTS

WO   2005024732 A1   3/2005

OTHER PUBLICATIONS

Otto, Nate et al., Verifiable Credentials Use Cases, W3C Working Group Note Sep. 24, 2019, https://www.w3.org/TR/2019/NOTE-vc-use-cases-20190924.

(Continued)

*Primary Examiner* — Zeshan Qayyum
(74) *Attorney, Agent, or Firm* — Lavanya Ratnam; Nathan Grebasch; Robert W. Busby

(57) ABSTRACT

Systems, devices and methods for use in biometric identification are disclosed for use resolution of ambiguity as to what identity is being asserted and/or which reference identities are to be used to build a gallery for identification. In implementations, are described to resolve ambiguity and in particular situations in which a unique authoritative identifier is unavailable for use in locating relevant references to serve as the basis for biometric matching and identification.

29 Claims, 4 Drawing Sheets

(56) References Cited

U.S. PATENT DOCUMENTS

| | | |
|---|---|---|
| 10,296,778 B2 | 5/2019 | Cuti et al. |
| 10,528,716 B2 | 1/2020 | Cornick et al. |
| 10,650,545 B2 | 5/2020 | Fisher et al. |
| 10,922,631 B1 | 2/2021 | Shahidzadeh |
| 2005/0167484 A1* | 8/2005 | Sussman ............... G07F 7/1008 235/380 |
| 2006/0055512 A1* | 3/2006 | Chew ...................... G07C 9/37 705/13 |
| 2006/0293892 A1 | 12/2006 | Pathuel |
| 2007/0036395 A1 | 2/2007 | Okun |
| 2008/0302870 A1 | 12/2008 | Berini et al. |
| 2010/0138246 A1 | 6/2010 | Carey et al. |
| 2011/0035371 A1 | 2/2011 | Pong et al. |
| 2011/0087888 A1* | 4/2011 | Rennie ..................... H04L 63/08 713/182 |
| 2011/0211735 A1* | 9/2011 | Langley ............... G06K 9/6807 382/115 |
| 2011/0231212 A1* | 9/2011 | Hurley ................... B64F 1/366 705/5 |
| 2011/0231911 A1 | 9/2011 | White et al. |
| 2012/0036071 A1 | 2/2012 | Fulton et al. |
| 2012/0159600 A1* | 6/2012 | Takagi .................... G06F 21/32 726/7 |
| 2013/0212655 A1 | 8/2013 | Hoyos et al. |
| 2013/0262305 A1 | 10/2013 | Jones et al. |
| 2013/0324086 A1 | 12/2013 | Celi, Jr. et al. |
| 2014/0100895 A1 | 4/2014 | Chen |
| 2014/0279640 A1 | 9/2014 | Moreno et al. |
| 2014/0313007 A1* | 10/2014 | Harding ................... G07C 9/37 340/5.52 |
| 2014/0363058 A1* | 12/2014 | Emmett ............... G06V 40/193 382/117 |
| 2015/0063657 A1 | 3/2015 | Poder et al. |
| 2016/0180078 A1* | 6/2016 | Chhabra ................. G06F 21/57 726/19 |
| 2017/0372541 A1 | 12/2017 | Attar |
| 2018/0225662 A1 | 8/2018 | Sibert et al. |
| 2019/0043148 A1 | 2/2019 | Vemury |
| 2019/0251571 A1 | 8/2019 | O'Reilly et al. |
| 2020/0213301 A1 | 7/2020 | Wisniewski |
| 2020/0334834 A1 | 10/2020 | Fisher |
| 2021/0057061 A1 | 2/2021 | Bass et al. |

OTHER PUBLICATIONS

Prosecution of U.S. Appl. No. 16/363,474 (US Patent Application Publication 2019/0220943), first named inventor Arun Vemury.

Prosecution of U.S. Appl. No. 16/366,584 (US Patent Application Publication 2019/0220944), first named inventor Arun Vemury.

Prosecution of U.S. Appl. No. 16/150,690 (US Patent Application Publication 2019/0043148), first named inventor Arun Vemury.

Prosecution of U.S. Appl. No. 16/595,095, first named inventor Daniel Boyd.

Prosecution of U.S. Appl. No. 15/223,172 (US Patent Application Publication 2017/0032485), first named inventor Arun Vemury.

Prosecution of U.S. Appl. No. 16/848,470, first named inventor Daniel Boyd.

* cited by examiner

BIOMETRIC IDENTITY DISAMBIGUATION

CROSS-REFERENCE TO RELATED APPLICATIONS

This application claims the benefit under 35 U.S.C. § 119(e) to U.S. Provisional Patent Application No. 62/741,869, filed Oct. 5, 2018 entitled "System and Method for Biometric Identification," this application also claims priority as a continuation-in-part, under 35 U.S.C. § 120, of and claims priority to U.S. patent application Ser. No. 15/223,172 filed Jul. 29, 2016, entitled "Identify Verification System and Method" which claims the benefit under 35 U.S.C. § 119(e) to U.S. Provisional Patent Application No. 62/198,776, filed on Jul. 30, 2015 entitled "Identity Verification System and Method" and U.S. Provisional Patent Application No. 62/221,436 filed on Sep. 21, 2015 entitled "Identity Verification System and Method," all of which are hereby incorporated by reference in their entireties.

GOVERNMENT RIGHTS

This invention was made with United States Government support. The Government has certain rights in this invention.

FIELD OF THE DISCLOSURE

This application generally relates to biometric identification of people.

BACKGROUND

Identification of people on a large scale is problematic for a variety of reasons. In a typical situation a person presents an identification document, such as a driver's license, that is used as a basis for comparison. If the person physically present matches the identification document the person is permitted to pass. Figuring out whether or not someone matches the identity he/she has asserted is a complex task and is prone to inaccuracy and delay.

SUMMARY

Resolution of identity ambiguity in conjunction with biometric identification is described. In embodiments, there can be ambiguity in the identity being asserted and which references (identities) are to be used as a basis for comparison. The foregoing can lead to inefficiency in biometric matching and identification that relies on biometric information that is of a larger size (computationally) than biographic information. Thus, systems, devices, methods, approaches, and techniques for reducing computing resource demand, increasing operational efficiency of devices, and decreasing overall amounts of time for a system used to perform identification based on biographic and/or biometric information is described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The like numbers are used throughout the drawings to reference like features.

DETAILED DESCRIPTION

Overview

Figure 1:
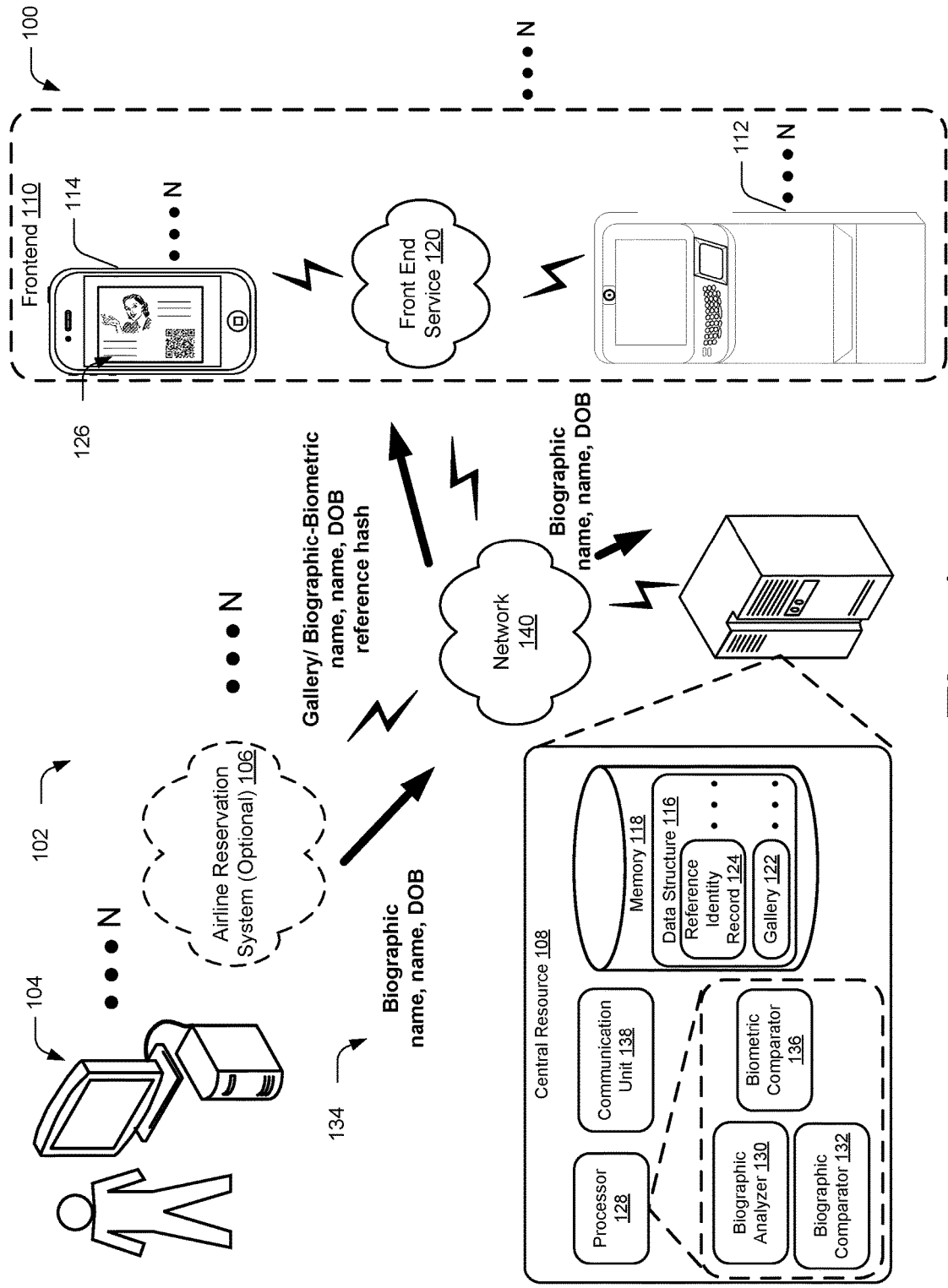
FIG. 1 illustrate operating environments accordance with one or more embodiments.

Identification of individuals for security screening is complex, time-consuming, and can be prone to human identification error. Example security screenings include, but are not limited to, mass-transit screening (such as at an airport or train station), testing or registration (e.g., department of motor vehicle offices), border checkpoints (e.g., port-of-entry), and the like. The complexity of these situations increases when the identification is not one to one (1:1). This is particularly relevant when the entity conducting the screening is not the source of the reference identity or there are multiple, e.g., more than one possible reference identity.

Computer based biometric identification is time consuming, processor intensive, and relies on comparison to biographic identification large amounts of data. As a result, optimizing the reference selection and reference against which captured biometric information is compared improves performance of such systems in comparison to systems that conduct the biometric comparison using more references. In this way for example, instead of a computing resource attempting to match against a (comparatively) larger number of references, biometric matching is done on a smaller number of references while retaining those reference identities that are predicted to correspond to likely biometric matches.

To aid the reader's understanding, biometric identification may be performed by electronically comparing biometric information captured from a person with corresponding reference to determine whether the captured information matches that of the reference to a sufficient level. A reference can consist of biographic and biometric information that is used for comparison to establish or exclude whether corresponding biometric information captured from a person matches or does not match the biometric information from the reference. The latter being an exclusionary biometric identity that attempts to determine whether or not biometric information captured from a person matches or does not match biometric information for an individual that is to be excluded.

When the biometric information captured from the person is compared to one reference, this is referred to as one to one matching (1:1). An example of this is when a person presents an identification document. In this case, the comparison seeks to determine whether the biometric information captured from the person matches the biometric information of the asserted identity, e.g., the information associated with the identity represented in the identification document that may be composed of biographic and biometric information.

When the information captured from the person is compared to multiple references, this is referred to as one to N matching (1:N) with "N" noting that that the information from the person is compared to any number of references.

The computing resources (e.g., communication bandwidth, processor resources, memory) needed to accomplish this can increase greatly based on the number of reference images being compare. Roughly speaking, comparing captured information to two references consumes about twice as much computing resources as it does in a 1:1 scenario since the captured biometric information is compared twice. While limiting the number of references to which the captured information is compared can be advantageous, failing to match the captured information to at least one of the references (to a predetermined threshold) is problematic as it is time consuming and resource intensive to attempt to match the captured information to additional references or capture additional information to be used for comparison.

Biometric identification is usually performed based on information captured as an image (such as in an electronic format in a predefined format) using some form of electromagnetic energy such as visible light, ultraviolet light, audible sound. For example, an electronic camera or scanner is used to capture an image of a person's face or fingerprint. Biometric information can include a variety of types of information, including but not limited to, a facial image, a fingerprint, voice print, gait, vein print, iris scan, liveliness detection, and so forth as understood by one of skill in the art.

Rather than electronically comparing an image captured from a physical person and comparing to a similar type reference image, a biometric algorithm is used to identify information from the image (e.g., information is extracted and in some instances data is derived from information within the image) that indicative of the overall image. Rather than mapping all or substantially all the data points of a fingerprint, a fingerprint mapping algorithm can used to identify those data points that are indicative, highly indicative, or more indicative of the overall fingerprint.

An example of derived data includes distances between points or other information that computed (e.g., calculated) from the data for the biometric feature. In the case of a fingerprint, a fingerprint algorithm specifically configured for this purpose can be used to hash the image in order to identify data that represents the biometric feature (e.g., fingerprint) and/or calculate so it is suitable for used as a basis for comparison/matching to determine an identity of a person having substantially the same biometric feature to a predetermined level of similarity between the representative data from the captured and reference fingerprints, e.g., images of the fingerprints. In this way, when biometric information captured from a person as part of an identification process is computationally matched to corresponding reference biometric information to a sufficient degree or threshold the person is determined to match the biographic information for the reference.

Different hashing algorithms can be used including proprietary algorithms. For a fingerprint, this may be about 14 data points that are highly indicative of the fingerprint based on location and/or location relative to other points represented in the image of the fingerprint. It should be appreciated that more intensive comparison can be done, such as when a higher degree of accuracy is warranted, comparatively more computing resources are available, and so forth.

Those of skill in the art will appreciate that other algorithms configured for other types of biometric features will implement approaches centric to the type of biometric identification. For example, a facial recognition algorithm calculates eye shape based on data points in an image associated with the eye, e.g., the portion of the image that is indicative of an eye. Other examples also exist such as the relationship of certain features, nose to eye placement and so forth. While the capture of biometric information as an image will be discussed throughout this is done to aid understanding, it is to be apparent that a wide variety of approaches and techniques can be used to capture and compare biometric information. For example, voice (audible) recognition can be used. It is the intention of this document to encompass and include such variation.

In some instances, identification includes negative identification or trying to exclude individuals as being associated with biometric information that corresponds to an identity that is to be excluded. An example of the foregoing is attempting to confirm whether or not biometric information captured from a person is sufficiently similar to biometric information for an individual who is to be excluded or warrants further scrutiny, e.g., additional or different security screening. For example, a concert venue may exclude individuals such as felons or those who have been banned from the venue for inappropriate behavior.

In some situations, the entity conducting the identification (such as part of a security or other screening) relies on another entity as the source of identity information. For example, the U.S. Transportation Security Administration (TSA) often relies on identity information from other sources (e.g., state/local governments, governments of other countries or regions) as authoritative of an identity that can be reflected in biographic/biometric information. Americans can rely on their driver's licenses, issued by a state department of motor vehicles (DMV)) as the basis of proving the person's identity. Only approximately twenty-five percent (25%) of Americans possess a passport. As a result, there may be ambiguity in which reference/identity is to be used as a basis of comparison. This ambiguity is even more problematic because people change names (due to marriage, adoption, or person reasons) and change biographic information, e.g., move, change authority issuing the identification (e.g., move between states) and so forth. These raise ambiguity issues with respect to the reference identity which is used as the basis of biometric matching. Additionally, some people misuse or implement false identification, e.g., false identification documents such as a fake driver's license to mask his/her identity or assume the identity of another individual.

There are ambiguity issues in determining which reference identity or identities are to be used for comparison, for example people make typographical errors (misspelling, transpose numbers), use a nick name (e.g., Nick for Nicholas), use a middle name instead of a first name, use an initial instead of a middle name, make use of different suffixes, e.g., Junior or Jr. for II. Also, a large portion of the general population has similar names, e.g., "John Smith."

In still other instances, people input random information due to lack of knowledge or temporary convenience. An example of the latter is someone who enters nine random digits into the "passport number" text entry box when making a reservation because he/she does not know their passport number (passport numbers in the U.S. are nine digits). Errors and omissions such as these make it difficult to accurately select which reference is to be used as a basis of biometric comparison for identification.

These scenarios are different from situations in which a singular reference is implemented, e.g., one to one (1:1) matching based on for example a unique identifier. Unlike 1:1 matching, biometric identification in which there is a sufficient degree of ambiguity as to what reference is to be used as a basis of comparison can impact efficiency, lead to delay and increased cost. In contrast, use of a unique identifier such a passport number (a correct one) that refers to one identity is comparatively efficient. Although a passport number is referenced, it should be apparent that an identity record may be referenced by a machine-readable code such as a two-dimensional bar code, a bar code, or machine-readable text characters that can include alphabetic letters and numbers as well as other symbols. While a passport is referenced throughout this document other identity records may provide a basis for unique identification.

Identity documents, like driver's licenses, include biographic information and biometric information about an individual. This information may be embodied in a physical token such as a polycarbonate card that a person carries with them to prove identity and indicate he/she has a particular status (e.g., an authorized motorcyclist). Although physical tokens are common, such information may be embodied in electronic form and held (such as in a memory) in a variety of ways. For example, a mobile driver's license may be electronically stored in memory in a user's mobile smart phone or on a "chip" that may be included in for example the physical driver's license, passport, or the like.

An authority that issues an identity document can retain a record of the biographic and biometric information associated with the particular record. This information can be held in a data structure such as a database (e.g., a relational database) in a variety of ways based on a variety of factors including physical and operational considerations based on information management principles. A record may be composed of biographic and biometric data. The information may be physically stored in memory together or be interrelated or linked in a way to ensure that the interconnected nature of the biographic and biometric information can be determined by a computing resource employed for that purpose. It should be apparent that information includes information derived from other information in or associated with the record. For example, the record may include a hash of biographic and/or biometric information represented in the reference. Those of skill in the art will appreciate that security can be increased by encrypting the underlying information and or encrypting a public key infrastructure (PKI) key from the issuing authority into the hash. Hashes and the use of hash functions will be discussed in further detail throughout this document.

As part of this information collection process, an issuing authority captures, or has captured on its behalf, biometric information to make it available for use in later identifications. For example, a DMV may capture a facial image and fingerprint as part of establishing a record such as in an enrollment process. In instances such as this, biographic information is also collected and interrelated to the biometric information. Example biographic information incudes, but is not limited to, first name, last name, middle name, date of birth, address, city, state, identifier (such as a combination of letters, numbers, symbols), gender, age, nationality, issue date, expiration date. Biometric information may include an image (such as an electronic file that contains an image of the individual's face or fingerprint), a representation of at least part of the information contained in or derived from biometric information (e.g., an electronic signature of the information), and so forth.

For example, a hash (hash value) of biometric information represented in an image is maintained as biometric information as part of the record. A hash can be created by applying a hash function to the information (e.g., the information from the image) to map the information (e.g., biometric information contained in an image) to the hash (value). A hash is a mathematical representation of the image that can be used in the case of a reference as the basis of comparison for matching a hash of captured image with the reference image. A hash may be considered an electronic signature of the underlying information, e.g., biographic, biometric, other information (security information, data checking information), and combinations thereof. In this way, a computing resource can compare the hashes (respectively from an image captured from the person and the reference image) to determine if the images are sufficiently similar to determine the biometric information matches to a particular threshold or level that can be predetermined. In embodiments biometric and biographic information are hashed together to generate a hash that is representative of for example an image and biographic information such as first name, last name and date of birth.

Turning now to use of biographic and biometric information such as in a checkpoint or other environment for identification purposes, issues associated with ambiguity and in particular ambiguity associated with a massive data system are discussed. Though ambiguity can be an issue in a variety of situations, it can be exasperated in situations in which the entity confirming or checking identities is not the issuing entity (entity issuing identification credentials) regardless of form, e.g., physical, electronic. Instead of using a unique identifier, such as a passport number, that refers biographically to a single identity and thus a particular set of biometric information, biographic information can be used to build a set of possible references against which biometric information captured from a person being identified or excluded is compared. In embodiments, the set of possible references (composed a variety of biographic and/or biometric information) is built to comparatively maximize the likelihood that the set includes at least one reference that biometrically matches the person seeking to be identified without over including references for comparison that would consume computing resources (communication bandwidth, memory, processor time) if included.

It will also be appreciated by those of skill in the art that there are rationales for ensuring the set of references includes all or substantially all the references that have biometric information that matches to a sufficient degree or threshold. For example, it is advantageous in some situations to identify all or substantially all the references that are a sufficient match to avoid a person having multiple identities (multiple different references) attempt to avoid accurate identification. This scenario can be addressed by performing maintenance, consistency, or validity checking on the references. For example, a computing resource, such those described herein, performs background maintenance, consistency, or validity checking on the references to insure one or more of the integrity, consistency, availability, or validity of the information.

Those of skill in the art will appreciate that while over inclusion of references is an issue under inclusion is likewise an issue since a failure to match imposes a burden on the device/system to obtain (e.g., pull additional references), which can consume communication bandwidth, memory and processor availability and involve issuing computing interrupts at inopportune times, e.g., times of peak demand when many people are seeking to be identified. The foregoing is a particular issue for TSA as it does not control when individuals present themselves for identification screening. For example, 9:05 am eastern standard time is typically busier than other times of the day due to flight scheduling.

Non-limiting examples of the above may occur in the situations in which people seek to travel by air in the U.S.

Though air travel is discussed the described devices, systems, methods, techniques, and approaches can be used in a variety of environments and situations. Example situations include border checks, testing, events (concerts, gatherings, meetings), registrations, and the like as understood by one of skill in the art. It is the intention of this disclosure to encompass and include such situations.

In the case of an individual with a unique name such as "Leonard Nimoy" the likelihood of ambiguity in identifying an applicable reference (which may be embodied in a computing record) biographically is low to due to the relative rarity of individuals having the last name "Nimoy" in the general population. In comparison, a large portion of the U.S. population have names that are similar. For example, there exists in the U.S. a large number of "John Smiths" or "Maria Garcias" in the U.S. While issuing authorities may assign identities a "unique" or semi-unique identifier (e.g., a driver's license number), this may not be suitable for a variety of reasons including but not limited to instances in which the identifier changes or the individual moves between jurisdictions, e.g., person moves from New Jersey to Florida.

In situations such as those above, first name last name is insufficient to limit the set of possible references to a computationally manageable number to maximize the likelihood of identification across the entirety of the relevant population for the given timeframe. To do this, date of birth (DOB) may be implemented as another piece of information (discriminator) that is implemented by a device or system operating in conformance with the present disclosure. Those of skill in the art will appreciate that some individuals chose to use their middle name as if it was their first name for a variety of factors including the cyclic occurrence of common first names such as, Jennifer, Olivia, and so forth. Still other chose to abbreviate one of his/her first or middle names (or both in the case of Thomas James going by "TJ") for reasons of convenience, personal preference and so forth. DOB can be used as it statistically reduces the pool of possible references while remaining highly indicative of the actual individual in comparison to name alone or other information that may vary, e.g., address. For example, while DOB is invariant information, other biographic information such as address, weight, height, eye color, driver's license may change or at least be reported to change.

DOB carries the additional benefit that statistically people are more accurate about reporting their birthday than other forms of biographic information. Even if an error is made (such as transposing numbers in the year of birth or making a typographic error) the error may be electronically identified.

For example, it is possible to identify that a traveler mistakenly typed "1927" as the year of birth instead of "1972" since the traveler in 2019 would be 82 years old (while it is possible that an octogenarian is indeed the person traveling) if all other aspects of the DOB match to a 47 year old traveler, albeit one that makes inopportune typographic mistakes, especially if there is not a reference for an 82 year old with the same first and last name and same month and day of birth.

Though first name, last name and DOB can be used as individual discriminators for identifying reference records, the information can be concatenated for use as a "unique" or "semi-unique" identifier when selecting which references are to be used as a basis of comparison for a person seeking to be identified. Having discussed how applicable references can be identified based on biographic information to select references for biometric identification, additional discussion of example environments, scenarios, approaches, methods and steps will now be discussed. As should be apparent, the above and below disclosure and principles can be used interchangeably as understood by one of ordinary skill in the art. It is the intention of this disclosure that the systems, devices, hardware (including but not limited to computer resources) to make use of the teachings of this document.

Having described various aspects in accordance with this disclosure, use (e.g., matching and/or identification) of biographic information to reduce or minimize ambiguity is discussed in further detail. Disambiguation of reference identity information based on biographic information is important as it minimizes resource consumption while promoting access to sufficient reference information to promote effective identification, including but not limited to biometric identification of individuals on a large scale. The foregoing may be done in environments and/or scenarios in which there is latent ambiguity in which reference identity is to be used. To aid in understanding, air travel scenarios in which a user makes a reservation to travel on a particular day by providing either directly or indirectly (such as through a third party (airline) computing system) are discussed in greater detail. Although these scenarios are discussed it is to be apparent that the principles of this disclosure apply to different contexts and situations, e.g. scenarios in which it is not known or there is little certainty when an individual will present himself/herself for identification. In some examples, the user (traveler) has had previous interactions with the system and devices described herein. In other examples, the user (passenger or traveler) has not either directly or indirectly interacted with the system, e.g., the person is traveling by air in the U.S. for the first time. Particular attention will be paid to individuals having one or more of a first name, a last name, and/or a date of birth that is to at least some extent ambiguous relative to a unique identifier such as a passport.

With the above narrative in mind, the details, structures, operations and configurations of various embodiments in accordance with the present disclosure are provided. It will be appreciated that the narrative and following details are explanatory only and are provided to aid the reader in understanding the principles of this disclosure in accordance with the understanding of one of ordinary skill in the art.

Operating Environment

Referring now to FIG. 1, an example environment 100 that can make use of the devices, systems, computer readable instructions, processes, approaches, and methods of the present disclosure are described. The principles of this disclosure are described in conjunction with sample environments to aid the reader understanding the technologies. The environments are not necessarily restrictive of the embodiments disclosed therewith and can be modified consistent with this disclosure and the understanding of one of ordinary skill in the art informed by this disclosure. As illustrated, individual devices in the environment can be varied based on design preference, environmental, operational, and similar factors as contemplated by one of ordinary skill in the art.

To better understand the environment, an example scenario in which "Maria Garcia" would like to arrange a trip from Washington Reagan National Airport to the Des Moines International Airport will be discussed. As described above, Maria Garcia like a significant portion of the population in the U.S. has a first and last name that is common. This raises ambiguity as to which references a system 102 performing identification is to use and what identity (biographic information) she is asserting.

Figure 2:
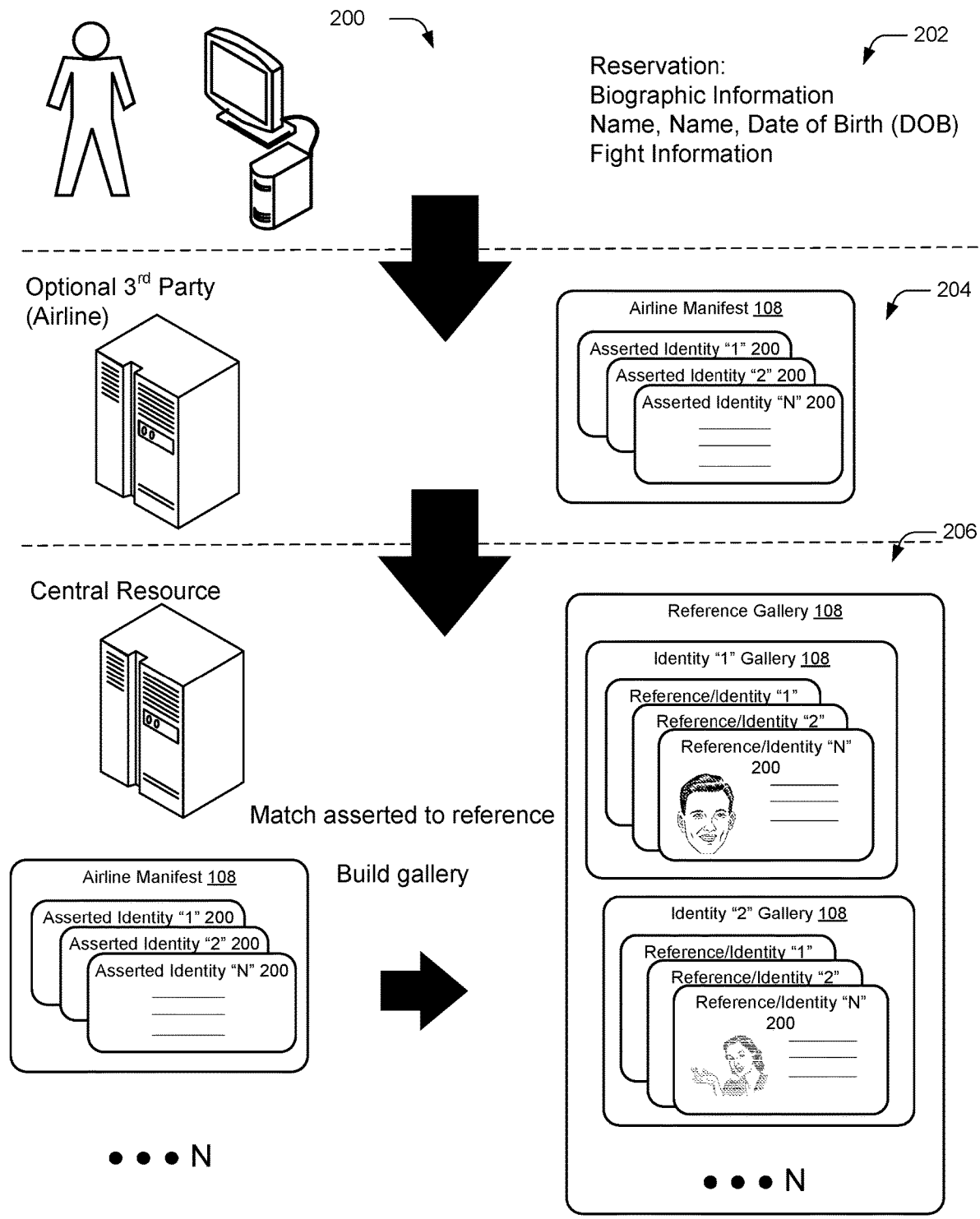
FIG. 2 is a high-level illustration of example steps in accordance with one or more embodiments of this disclosure.

To aid understanding FIG. 2 provides a high-level illustration of at least some of the processes (200) that are occurring in conjunction with the systems, devices, techniques, approaches of this disclosure including, but not limited to, that of FIG. 1. FIG. 2 and reference to it is provided to aid the user and is intended to be informative only and not to restrict the accompanying disclosure in which it is referenced. Input of biographic information and optionally biometric information is reference as 202. The intake/creation of references (identities) such as by a central resource is discussed in conjunction with issues related to biographic ambiguity. The foregoing is generally illustrated at 204. Then creation of a reference gallery, such for situations in which there is information about which people will present themselves for identification, is described. Gallery creation, such as by a central resource or backend, will likewise be discussed in conjunction with ambiguity. Issues such as to which references are to be employed and which identity people are presenting is explained in conjunction with the systems, devices, approaches, techniques, in accordance with the present disclosure. This is generally illustrated at 206.

In an example, Maria makes a flight reservation, via her Internet enabled computing device 104, with an airline in advance to locate a seat on the flight to Des Moines. She may do this by visiting, for example, a website 106 which may be operated/controlled by one or more of a variety of types of entities, e.g., airline, train operator, government agency, third party (e.g., a clearing house or an entity that agrees to operate as a middle-man. Maria, as part of this process, provides some biographic information about herself. She enters her first name, "Maria," her last name, "Garcia," and her date of birth Mar. 24, 1977. She may be asked for/to enter additional information for a variety of reasons including security, billing, economic incentive and so forth. Example information includes biographic information. Example information includes, but is not limited to, address, previous address, redress number, known traveler number, passport number, gender, frequent flyer number, information related to persons she is traveling with (children/lap infant), mobile phone number, email address, credit card number, seat preference, driver's license number. (An example of this is illustrated a high-level at 20×.)

For the purposes of understanding, this discussion will describe examples that do not include the use of a unique identifier such as a passport number or known traveler number. Those of skill in the art will appreciate that some identifiers, though facially unique may be considered semi-unique or non-unique for a variety of reasons including, but not limited to redundancy, lack of control over issuance, expiration/modification of the identifier and so forth. For example, for some entities a "unique" identifier issued by another entity is not treated as a unique identifier for a variety of reasons, e.g., the reviewing entity did not issue/control the identifier, the issuing entity may reuse the identifier, the issuing entity may issue the same individual another identifier (e.g., a person who possess a driver license for a motor vehicle and a separate license for a motorcycle). The foregoing may apply to situations in which the entity performing the identification is not the issuing entity (the entity that issues or assigns credentials) and may be even more applicable in which there are multiple entities issuing credentials. As is to be apparent, the entity conducting the identification may rely on the issuing entity to provide a ground truth as to the accuracy and validity of the identity.

In embodiments, the information is electronically sent to a central resource 108 especially constructed for use in conformance with this disclosure, e.g., a central resource configured to broker biographic/biometric information. This may be done directly (e.g., Maria's computer to the central resource 108) or via an intermediate (Maria's computer to website to central resource) and may vary in configuration based on the entity operating the central resource and (as applicable) the input website, e.g., airline site or "app." (An example of an airline or other third party system (e.g., a website) doing this on behalf of the users is illustrated at a high level at 202.)

Although device to device electronic communication is illustrated, in some instances the information, information derived from the information, or at least a portion of the information provided by Maria (biographic and/or biometric is encoded into machine readable information such as a two-dimensional barcode or Quick Response code (QR CODE, Denso Wave Inc.), which can be presented to an optical reader (e.g., an optical device or camera having the capability to read the barcode) associated with a portion of the system 102, e.g., the central resource 108, the frontend 110 (e.g., a touchpoint 112). The information may be encrypted (such as by public key infrastructure (PKI)) and embodied physically (on a sheet of paper) or output on a display included in for example on smart phone. An example of this scenario may be a person applying for a travel visa or completing a customs declaration ahead of time and then presenting information (via the barcode) when he/she presents himself/herself for admittance at a port of entry.

In the case of Maria and other air travelers, at least some of the information entered is forwarded to the central resource 108. In other embodiments, information (e.g., biographic information is not communicated to the central resource until a later time or in some instances not at all or only when it is requested/forwarded by a frontend system that is discussed in further detail below. For example, Maria waits until she arrives at Reagan before providing information by displaying a barcode or other machine readable information on her smart phone 114 display and placing it so it can be read by an optical scanner included in the frontend 110 environment portion of the (overall) system 102.

The central resource 108 is representative of computing resources that contain a combination of hardware (processor, memory, and so forth as recognized by those of skill in the art) and/or software that is configured to cause the hardware to function in a pre-programed manner to provide the described functionality ascribed to the central resource. The central resource 108 in embodiments is associated with a data structure 116 maintained in memory 118 associated with the computing hardware that forms the central resource. The memory can be included in or communicatively connected to the processing resources of the central resource.

In examples, the data structure 116 is a database such as a relational database that maintains information in a related matter such as via a collection of tables that contain specific types of data that may be interconnected. Information, whether biometric or biographic, can be maintained as a record or a collection of interrelated records that are interconnected (e.g., linked) so the computing resources that form the central resource is informed of how the constituent information is logically connected. An example database structure is an ORACLE (Oracle, Inc., Redwood Shores, Calif.) relational database.

In embodiments, interrelated information (e.g., biographic and biometric information) forms a reference against which corresponding biometric information from a person captured by for example a camera, scanner, microphone, or other collection device is compared to verify the identity of the person matches or excluded from the identity of the reference. The information making up the reference can be included in one or more records (e.g., computer records). Those of skill in the art will appreciate that while a record or records may be configured to or expanded to contain a set of information not all records will hold the same quantity or type of information based on design preference, operation parameters, legal constraints, and so forth as understood by one of skill in the art. For example, records for one class of individuals may include facial and fingerprint information while another class only has facial biometric information. In the foregoing example, it is to be apparent that the record includes at least some biographic information, but it too may not include all the information the data structure is configured to hold, e.g., the system permits partial records.

Additionally, the central resource 108 may be configured to interrelate biographic and/or biometric information for one reference (identity) with that of another. For example, rather than deleting a record for a spouse that has changed his/her name due to marriage, the central resource is programmed to maintain the record associated with the maiden (original) name and associate with a record or records for the married name. In this way, the system can relate biographic/biometric information to account for typical identity related issues that occur in the general population. It likewise should be apparent, that records (and identities) can be interrelated for a variety of other reasons including reasons related to biographic information management. Interrelating records can be done in response to input from a user or based on a computer implemented algorithm that associates one or more records based on one or more of the following approaches, artificial intelligence, machine learning, heuristics, and the like algorithms for determining interrelationships of records based on one or more of the biometric or biographic information.

For example, a central resource 108 configured according to this disclosure is constructed to interrelate records where the biographic information being evaluated by the central resource (which may not be the entirety of the accessible biographic information) matches to a predefined threshold (but is not an exact match or a substantially exact match). The central resource in embodiments is configured to interrelated records that biographically similar. Examples include records associated for "junior" with records for "II" (indicating the second), a record with no suffix with a record for "Sr." (indicating senior), a record for Rebecca with one for Becky, and so on as understood by one of skill in the art.

It is to be apparent, the central resource 108 can be configured to perform data maintenance to clean-up data errors, identify errors, improve operational performance of the central resource or data structure and so on as understood by one of ordinary skill in the art to maintain one or more of the validity, accuracy, availability, integrity, error-free or minimized nature of the information contained therein. For example, if a discrepancy is electronically discovered in a reference, e.g., year of birth 1908, and a frontend device forward a year of birth as 2008 and the identification is successful, the reference is updated in the central resource. It is to be apparent that the original incorrect data may be retained and made identifiable to the central resource or data indicating the previous status, e.g., error in the data may be included in a record for the reference.

References can be created or entered in a variety of ways. For example, a central resource 108 can accept identities as part of an enrollment process. In scenarios such as this, people may voluntarily enroll information about himself/herself so it is available for identification. An example of this is a department of motor vehicle register that provides people the opportunity to enroll by authorizing the DMV to electronically communicate at least some of the information to the central resource. In other instances, voluntary enrollment may occur as part of an identification process. For example, a touchpoint 112, used in conjunction with identification (such as part of the frontend), communicatively coupled to the central resource 108 may prompt the person submitting information (e.g., biographic and/or biometric) to volunteer to have the information or a portion of the information retained for subsequent use. At least some of the information can be submitted manually such as by typing/entering it or by electronic communication (e.g., WiFi, a radio frequency identification (RFID) reader, BLUETOOTH (Bluetooth SIG, Kirkland, Wash.) such as when a mDL is used), by optical means (reading a barcode printed on a piece of paper, barcode output on a display included in a smart phone) or the like means.

In some instances, enrollment occurs after identification. A scenario involving this is electronically offering the person the opportunity to enroll and use at least some of the information communicated to a frontend device (kiosk, reader, etc.) and/or captured as part of the identification process. The information may be stored in the data structure included in the central resource 108. An example of the latter situation is a system 102 including the central resource 108 using or enrolling an image collected at a security checkpoint for use as a reference for future interactions, e.g., using a hash derived from the image as a basis of an electronic comparison as to whether the images/hashes are similar to a particular degree or threshold. In situations such as this the central resource 108 is programed to generate a temporary record that is provisioned to expire at a predetermined time (e.g., 24 hours) unless it is electronically populated with information and/or authorized for retention by the central resource as part of an informed consent process. The foregoing can apply to information that is captured as part of an identification process. For instance, a user may voluntarily permit mDL information, or a portion thereof, communicated from his/her smartphone to be enrolled in the data structure for future use. Collected information can be combined or augmented with biometric information captured from the person as part of an identification process.

In embodiments, at least one of the frontend service 120, central resource 108, or touchpoint 112 are configured to expire, remove or overwrite information in the registry, lookup table or data structure at a predetermined time (e.g., anticipated departure of a flight, after twenty-four hours) or responsive to an event, e.g., actual departure of a flight, after completion of final screening, responsive to a device failing to respond to a communication check/heartbeat communication. In embodiments, the system 102 (e.g., central resource 108) retains or stores at least a portion of information in (comparatively) longer term storage such as for historical purposes; in other instances the system (e.g., the computing resource or cloud service) is configured to retain summary information or derived information (e.g., a score, anomaly yes/no); in other instances the storage of information is conditioned on user affirmatively indicating he/she want the system to retain at least a portion of the information.

It is to be recognized that this process (offer/enrollment/information communication if applicable) can be done in a way to promote securing and reassure the user/traveler that the communication is genuinely from the entity performing the identification. While enrollment may be done on occurrence of a first interaction, periodically (annually), or upon the occurrence of an event, e.g., a biometric image or information being out of tolerance or below a threshold. An example of the last item is a person being prompted (indirectly by the central resource) on his/her smart phone after identification if their picture is over ten (10) years old. This can be done via an "in app" request (such as in an app for a common carrier or the entity performing identification (e.g., TSA), a text message, an email or the like methodology.

In other instances, such as when the central resource 108 electronically determines that biographic information supplied by a person does not correspond to a reference within the central resource, the central resource builds a record for input into memory 118 to accept information that is to be populated at a later point in time even in situations where limited information is available. Take the example of a young person flying for the same time. Upon receiving at least some information (e.g., biographic information such as first name, last name, and DOB) the central resource can build a record or a partial record to receive additional information. When for instance the record is build based incorrect information, the central resource 108 can be programed to merge or eliminated the applicable record when the central resource electronically recognizes the error determines the records are for the same individual. An instance of this is a transposed month day, such as may be done by someone who is more familiar with the European day month year approach rather than month day year as is the norm in the U.S.

In embodiments, the central resource 108 indexes the records using a variety of approaches and may assign records respective identifiers such as a unique record number or locator. In some instances, the central resource 108 makes the records electronically available (indexed) based on biographic information, such as the first name, last name, DOB. Although this biographic information (e.g., first name, last name, DOB) may be present on a respective basis, in some instances this information is concatenated and held in a unitary manner to act as a unique or semi-unique identification or record locator. For example, the central resource 108 is programed to use the identifier mariagarcia03241977 for Ms. Garcia of the previous examples as a mechanism for electronically identifying biographic and/or biometric information that is interrelated for Maria Garcia. As will be discussed later, the central resource can use this identifier as a mechanism to identify potential references for a gallery 122 as part of or in anticipation of an identification process.

The contents of a reference can vary based on a variety of factors. Although more extensive information may be included in some records a minimum amount of data may be specified based on a variety of identification and data management considerations. For example, a data set containing: first name, last name, DOB may be acceptable or at least temporarily acceptable for a predetermined interim time period for biographic data. Biometric data may include at least one image of a biometric feature (face, fingerprint, iris) and a hash of the image. Those of skill in the art will recognize that parameters may be placed on the image, size (pixel), resolution, angle, contrast, color parameters, and so on to ensure that the image is of sufficient relevant quality to serve as a reference. For example, service as the basis for application of a hash function that results in a hash that in turn is used for electronic comparison by a computing resource configured to electronically determine whether or not a person represented in a captured image sufficiently matches the reference to identify the person as corresponding to the identity affiliated with the reference, e.g., the identity. It is to be recognized that reference can include additional information, different information better quality information than is implemented for identification or routine use. For example, a record containing the reference 124 includes a high quality biometric image 1200×1200 dots per inch (dpi) than that communicated to a frontend device for use, e.g., 600×600 dpi image for use or reference. In another example, the information may be of a different type. An example of the foregoing is the use of a hash of a facial image for identification while the reference includes a version of the underlying facial image in place of or in addition to the hash.

It is to be apparent that an intermediate (e.g., website 106 operated by an airline) may be augment, modify, or otherwise provide additional or less information than was obtained from the user (e.g., Maria) or input on the user's behalf. For example, instead of requesting that Maria manually enter the requested information, the website or an application "app" supporting this function may automatically or at least semi-automatically populate or calculate at least a portion of this information base on previously entered information, e.g., information in Maria's profile, information obtained from another "source," e.g., from a mobile driver's license (mDL) included on Maria's smartphone 114, if that is the computing device our friend Maria is using. The driver's license information may be collected without regard for how the mDL 126 is supported by the hardware/software forming the smartphone 114. The information from Maria (whether directly or indirectly) can be electronically communicated in a variety of ways using a variety of mediums. The data can be pushed or pulled between the various computing resources forming or supporting the input website and the central resource 108. For example, an airline reservation system, functioning as an intermediate, may send the information in batches, periodically, or when it is collected from or on Maria's behalf. It is the intention of this document to encompass and include such variation.

The computing resources that form the central resource 108 may be configured in a variety of ways based on design preference, operational factors, redundancy, and so forth. While a server type device is illustrated for ease of understanding, those of skill in the art will recognize that the hardware/software forming or supporting the central resource functionality can be configured in a variety of ways including, but not limited to a distributed computing system, a cloud computing arrangement in which all or part of the devices are virtualized, and so forth. Having explained how biographic and biometric information can be populated into a central resource, implementation of the information in biometric identification will now be described in additional detail.

As illustrated in FIG. 1, the central resource 108 includes a variety of hardware (e.g., processor 128, communication unit 130, memory 118) and software that is implemented as electronically executable instructions that cause the hardware to be specifically configured in a particular manner consistent with this disclosure. The illustrated processor 128 is a complex electronic circuit designed to respond to certain electronic inputs in a predefined manner. The circuits of a hardware processor are arranged or configured to respond to inputs in accordance with the hardware processor's design. A processor though usable for a wide variety of operations and purposes, is configured with a particular design.

Processors respond to executable instructions based on its native instruction set. In operation, the processor executes multiple native codes in a predetermined sequence. The sequence of codes, or logic, are stored in memory and are loaded and executed by the processor to carry out or provide a specific function that is set by operation of the processor in conjunction with the code. Logic that is comparatively more complex consumes more time/processor resources than less complex logic. Logic that causes a processor to obtain, load, process, or unload a larger amount of data causes the processor to carry out a proportionally large number of operations and, likewise, causes the memory to store and to re-store a proportionally large amount of data.

In implementations where multiple computing resources, e.g., independently capable computing resources are implemented, individual ones may operate in a redundant fashion, perform load balancing, and so forth to provide substantially seamless support. Redundant support and/or load balancing between multiple computing resources can be handled in a variety of ways. In some instances, different systems can perform different tasks or portions of tasks, while in other respective central resources accept/hand-off tasks as the individual computing systems become busy/become less busy. In additional embodiments, components or functions performed by the central resource 108 may be performed or partially by a resource located in a local environment, such as at an airport, port, customs facility, port of entry, and so forth. Those of skill in the art will appreciate that the hardware/software forming the central resources can be virtualized such as to provide cloud type support.

As illustrated the central resource includes a biographic analyzer 130. A biographic analyzer 122 is representative of hardware/software implemented as instructions that are stored in memory 118 until used to by the processor 128 to cause central resource to be configured or adapted to use at least a portion of the asserted biographic information (e.g., name, name, DOB) to query the data structure for references that are biographically similar to that in the asserted information. The query results in the collection of at least some information from identified references being made available, such as by placing the information in a registry which may be held in memory for ready use by the processor. For example, the biometric analyzer 130 may return a set of references in which the respective references include some information from corresponding references in the data structure 116. For example, instead of returning all the data from an identified reference in the data structure, the biographic analyzer 130 returns some information, e.g., name, name, DOB, a hash of a facial image, and a lesser quality reference facial image than that in the data structure reference.

The biographic comparator 132 is representative of hardware/software implemented as instructions, e.g., executable code, that are stored in memory until used to by the processor to cause central resource to be configured or adapted to configured to calculate a respective degree of similarity between biographic information, e.g., biometric information obtained from a first image and biometric information from a second image. The biographic comparator 132 (e.g., logic) is configured to calculate a respective degree of similarity between the biographic information in a reference 124 included in the set of records in the data structure 116 and the person's biographic information, e.g., in this case the information submitted by Maria 134.

For example, the biometric comparator 132 is capable of comparing biometric information captured from person 134 and biographic information in a reference 124. In another example, the biometric comparator 132 electronically compares biometric information from one reference with corresponding biometric information from another reference to determine if the biometric information is the same, substantially the same, or a match to a particular extent, degree or threshold. The biometric comparator 132 may do this as part of a background process to determine whether and/or to what extent two or more references are biometrically similar. Asserted information may include information asserted during identification (e.g., submitting mDL 126) or as part of a registration or reservation process, e.g., making an air travel reservation, captured from a physical person, from an electronic identity credential. In embodiments, the biometric comparator 132 is constructed to compare multi-modal information, e.g., fingerprint+iris, face+fingerprint to match and/or exclude individuals represented in underlying images, e.g., digital images contained in a computer file. In embodiments, the biometric comparator is constructed to compare multi-modal information, e.g., fingerprint+iris, face+fingerprint to match and/or exclude individuals represented in underlying images, e.g., digital images contained in a computer file. Degree of similarity may be based on a particular degree (e.g., 99.99%) or a threshold, e.g., a threshold not based on percentage.

A predetermined similarity threshold, in an embodiment, is set to indicate a particular likelihood that the asserted biographic information matches (to some extent) biographic information from a reference. Meeting or exceeding the threshold may be consider a match although those of skill in the art will appreciate that there may be multiple "matches" with some being scored or valued higher or lower than others that are within the category of a match. For example, for a person with a unique name, the gallery 122 (for understanding illustrated as being in memory 118) may contain but one reference (if a reference exists). In another example, a person with a more common name, the gallery may contain multiple references some of which may be the person being identified and some of the references being for other individuals that are merely biographical similar. For example, the biographic comparator may return twenty (20) references for Maria Garcia with a DOB of Mar. 24, 1997 based on the biographic comparator 132 electronically determining the 20 are matches that meet or exceed the threshold. For the purposes of explanation only, one of the matches may be for "Maria Garcia" with a DOB of Mar. 24, 1996 that was created due to a typo, but is still reflective of the Maria Garcia who is traveling to Des Moines. Another reason for a biographically different, but a biometrically similar reference is that Maria used her middle name "Emily" as her first name in a previous interaction. Example biometric software includes but is not limited to NexaIFace™ or AwareABIS™ from Aware, Inc. (Beford, Mass.); Integra-ID™ or NeoFace™ from NEC, Corp. of America (Irving, Tex.); BioID™, BioID GmbH (Nurnberg, DE); MorphoBIS™, MorphoTrust (Alexandria, Va. (now Idemia Inc.)); BioMatch™ Precise Biometrics AB (Lund, Sweden), and so on. In embodiments, information associated with a particular trait or traits, e.g., eye spacing, is used to aid in rapid general identification or elimination of possible matches, while other identification techniques (other traits, combinations of traits, behaviors, etc.) are used to promote accurate identification by confirming an individual's identity.

In examples, one or more of the biographic comparator 132, biographic analyzer 130, or biometric comparator 136 make use of one or more of machine learning, artificial intelligence, Monte Carlo simulation, probabilistic forecasting, heuristics predictive modelling, Bayesian probability modeling, event tree analysis, fault tree analysis, artificial intelligence approaches, or Markov modeling to perform the described functions.

The communication unit 138 is representative of one or more devices able to electronically communicate information to/from other devices and components including in instances those included in or external to the system. Example communication units include but are not limited to wireless modems (such as an 802.11 compliant unit), wired (e.g., Ethernet-ready) or other such communication interfaces, near field communication (NFC) transceivers, and/or a cellular communication transceiver. Example 802.11 compliant modems/cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, N.Y. As will be appreciated, the communication units can be used in a variety of combinations and arrangements based on operation parameters and design preference, to communicate with system components and resources (e.g., third party computing resources) external to the system. In embodiments, communications unit 138 includes a combination of hardware and software, while the processor 128 can support the communication unit 138, in other instances a dedicated processor is included in or with the hardware that forms the communication unit 138. For continuity, this discussion will continue to make use of the above scenarios involving Maria Garcia and her air travel to Des Moines.

With continued reference to FIG. 1 and periodic reference to FIG. 2, in embodiments in which a person presenting himself/herself for identification is known, or can be predicted based on one more factors (e.g., flight reservation, visa start/end date), the central resource 108 (such as through use of the biometric analyzer and comparator 130, 132) can build a gallery 122 (e.g., a reference gallery) of references that it will make available for identification. (An example of this is illustrated at a high level in FIG. 2 at 206.) For example, the central resource builds one or more galleries so they can be made available to devices that function as the frontend portion of the system supported by the central resource, e.g., one or more terminals or devices with computing resources such as touchpoints 112, integrated systems of computing resources and biometric information capture devices and so on including user provided devices such as smart phones. In examples, the central resource (e.g., through use of the biometric comparator and analyzer 132, 130) builds a gallery that corresponds to references that are sufficiently similar (to biographic information that is scheduled to or anticipated based on variety of factors to be asserted for identification. The central resource 108 can communicate the gallery, to in the case of Maria, to a frontend service 120 supporting Reagan Airport so it is readily available when Maria is to travel. Though galleries for multiple travelers are discussed, in some instance a gallery may be specific to a particular asserted identity, e.g., if a user makes a last-minute reservation, such as after a gallery for a particular location has been communicated to a frontend system.

As should be recognized, a biographic comparator 132 conducts this biographic similarity analysis using an algorithm (implemented as a program of computer executable instructions, designed to cause the computing resource calculate how similar and or not similar the supplied biographic information is to references in the data structure or supplied in another manner, e.g., supplied as part of identification such as if a person asserts an identity in a mDL 126 (composed of biographic/biometric information) during an overall identification procedure. Such algorithms may implement a variety of approaches including, but not limited, to heuristic, ad hoc, artificial intelligence, machine learning approaches to electronically determine, based on a calculation whether or not or to what extent asserted biographic information corresponds to information in various references.

For example, on the day or shortly before Maria is to travel, the central resource 108, via the biographic comparator and analyzer 132, 130, aggregates at least some of the biographic information supplied by or on behalf of people scheduled to travel from a particular facility (e.g., Reagan National Airport) to build a gallery of references for use in identification for use by a frontend system implemented for Reagan Airport. In embodiments, the central resource 108 does this by pulling the relevant information from one or manifests supplied by airlines with flights scheduled to depart Reagan on the given day or applicable time period. While the central resource may maintain and/or have been supplied additional biographic information, it may use the first name, last name, and birthdate (DOB) for the individuals to build a gallery of relevant biographic information for people scheduled to present themselves for identification. The central resource can do this by extracting biographic information (first name, last name, DOB or a concatenated version) from that supplied to it by the people or third parties (e.g., airlines). This "raw" information may be held in the central resource memory 118 such as in a registry that periodically updated/deleted.

As discussed above, there may be inconsistencies between the supplied biographic information (first name, last name, DOB) and that of the references for a variety of reasons including, typos, transposed digits, use of different/alternative names, etc., and as a result there may be some ambiguity in what identity was being asserted when the biographic information was collected. In embodiments, the biographic comparator 132 is configured to address these errors, inconsistencies, or omissions as part of determining if a match to a particular extent exists between asserted biographic information and reference biographic information.

The central resource 108 may use the biographic information (first name, last name, DOB) to search its database for references (embodied as records) that match (are sufficiently similar) that they should be made available for identification purposes. Those of skill in the art will appreciate that central resource can store the biographic information (first name, last name, DOB) temporarily in memory (such as a register) as it builds the gallery.

In embodiments, the central resource 108 builds a gallery 122 of references of one or more individuals (e.g., a plurality of individuals) for use in identification. For example, the central resource builds a gallery of individuals scheduled to travel from a particular location (e.g., Reagan National Airport) for a particular time period, e.g., a day such as 24 period of time. Although time and location are described a system or device operating in conformance with this disclosure can implement additional factors or different factors. The central resource for example can build a gallery for a particular flight (e.g., Braniff flight 3719), a particular air carrier (e.g., Nicholas Airlines), and so forth.

It is to be appreciated, that the gallery 122 may include references that, for example, the central resource as determined are biometrically related to one another. For example, the central resource includes a reference that, though not biographically linked, is biometrically similar as determined by the central resource as part of its information maintenance operation such as done by the biometric comparator as part of a background operation, e.g., if a person obtained a false id with another state that has different biographic information but the same, substantially the same, or similar biometric information to a particular degree or threshold such as a preexisting or predetermined threshold. (As will be understood by those of skill in the art, a threshold or level may be dynamically set (e.g., varied based on factors such as but not limited to a "security level") while being predetermined for the purpose of application of the threshold, e.g., the threshold is dynamically determined so it becomes predetermined, which is then applied to the thresholding or leveling computation/calculation.

In the case of exclusion identification, a gallery of references may contain biometric information for individuals that are prohibited. In examples, biometric information for individuals seeking to be identified are compared against the biometric information in the exclusion gallery to ensure none of the individuals represented by the exclusion gallery are to proceed.

The central resource 108 in embodiments electronically communicates the information to a localized cloud service (e.g., frontend service 120 via network 140) that supports devices implemented as part of an identification process. For example, the central resource communicates a gallery 122 of references that correspond (to a sufficient/predetermined degree) to people that are expected to present themselves for identification in a given time period, e.g., references that respectively contain biographic and/or biometric information, for those people scheduled to depart from an airport within a twenty-four (24) hour period. Though the central resource can push a gallery of references, in some embodiments a device included in the frontend (e.g., frontend service) pulls the information. In another example, the central resource builds a gallery of references for individual that correspond to a sufficient degree to people anticipated to be on a particular flight or other form of conveyance, e.g., present themselves for identification. In other embodiments, the gallery corresponds to people scheduled to take a test, cross a border checkpoint or the like. Having described the construction, operation, functionality of the central resource, example frontend environments, configurations, devices, approaches and techniques will be discussed. It is to be apparent that the frontend can be used in conjunction with the central resource or other backend system configured in accordance with this disclosure as understood by one of skill in the art.

In additional embodiments, the central resource performs the functionality of biometric matching based on an image of a person captured by the frontend, e.g., a touchpoint 112. In this scenario, rather than sending a gallery the central resource receives one or more of a biometric image (e.g., a facial image, a fingerprint image) or information derived from the biometric image, e.g., a hash or a portion of the information included in the image. In scenarios such as this, the biometric comparator 136 functions in a manner described in conjunction with the biometric module 350 and/or the biometric comparator 336. In this example, the central resource forwards an outcome of the comparison, e.g., match, identification, no-match, an outcome (e.g., open egate) responsive to the outcome of the biometric match/identification as described throughout this document.

The frontend service 120 (e.g., a server, virtualized server, cloud service) and central resource 108 can communicate in a web-enabled manner. For example, data communication is performed using hypertext transfer protocol (HTTP) or hypertext transfer protocol secure or hypertext secure sockets (both are referenced as HTTPS). In an additional implementation, extensible hypertext markup language (XHTML) is used to communicate or present information. The collection device and central authority may implement other standards, such as extensible markup language (xml), in conjunction with or separate from public key encryption (PKI) used to encrypt the data for communication or storage. In embodiments, the touchpoint or other identification devices (e.g., terminals) and the frontend service 120 and the central resource 108 communicate in a client-host arrangement.

Figure 3:
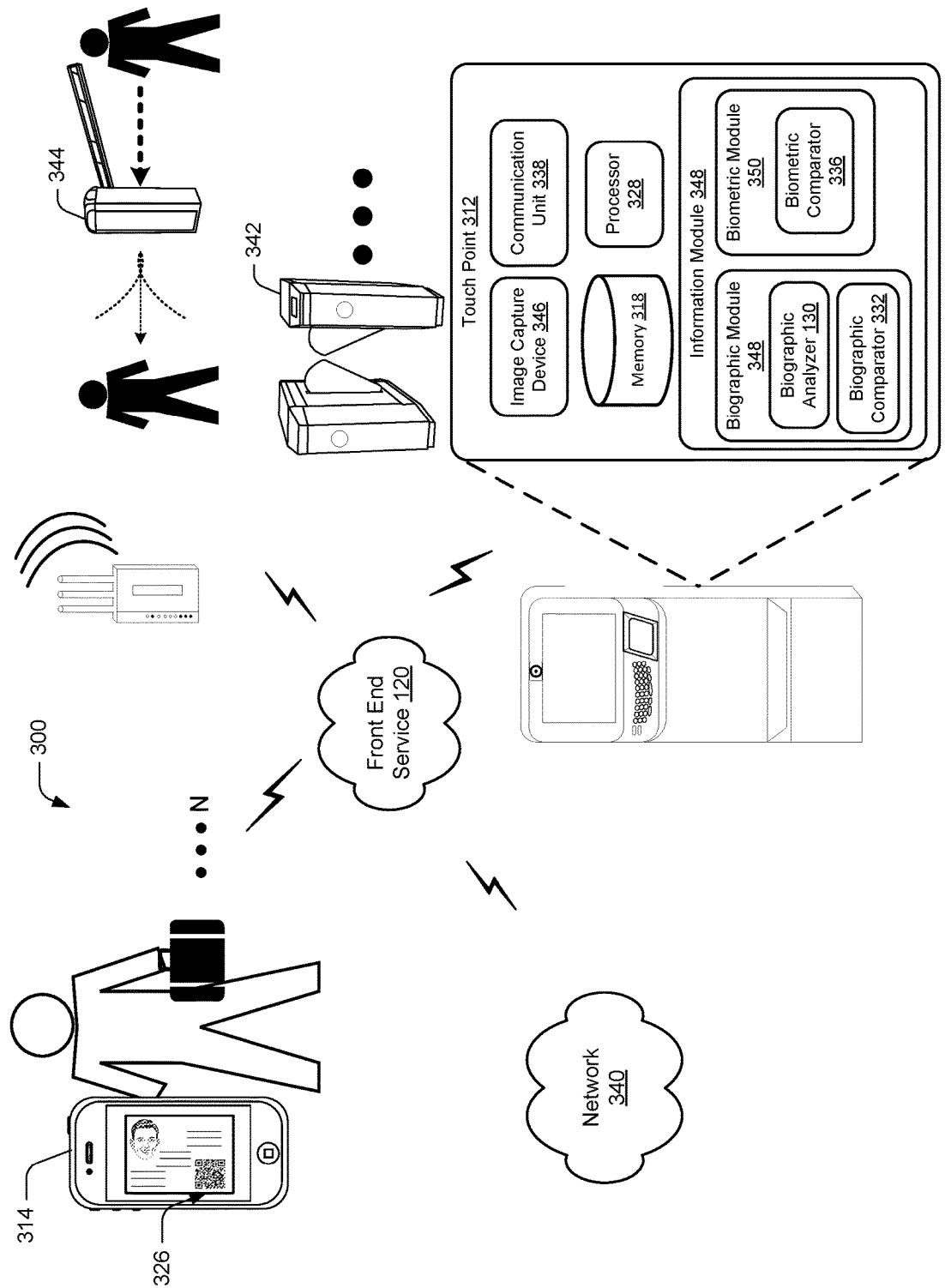
FIG. 3 is an illustration of a frontend environment and system consistent with one or more embodiments of this disclosure.

As illustrated in FIG. 3, a frontend environment with a frontend service 320 for use with this disclosure is shown in further detail. For example, the frontend 310 is an interconnected system of resources including computing resources, devices for collecting biographic information and/or capturing biometric information from people seeking to be identified. Identification may be included in or part of a larger system or as part of a larger process. An example of this is a security screening process gaining access to a sterile environment (e.g., a TSA checkpoint), a test facility, or port of entry. The various components forming the system (e.g., hardware supported by tangibly embodied software) can be communicatively coupled in a variety of ways (by arrangement or technology employed) by one or more communication networks that comprise physical and/or wireless communication connections.

In some embodiments, identification and devices used for this purpose are associated with a particular location or facility. While a checkpoint environment is discussed, in other embodiments activities and or devices used as part of identification processes can be distributed in for example an airport or other location. For example, embodiments that implement portable computing devices, such as user smartphone 314, can permit users to perform some identification related activities in a comparatively more dispersed area than a check point. An example of this is a frontend system that permits users to check-in, commence or perform different portions of an overall identification process upon arriving at an airport or other facility. In scenarios, a user may wait to provide biographic information and do so only when he/she arrives for travel, e.g., as illustrated by the person with a mDL on a smartphone. In this instance, the user via their smart device can electronically communicate the information in a variety of ways, e.g., wirelessly, via cellular communication, or optically by scanning a barcode output on an included display.

The frontend service 320 is representative of a combination of hardware and/or software to generally manage/coordinate/support operation of the various identification related devices under its control, e.g., touchpoints, biometric capture devices, terminals, credential readers (optical, wireless, RFID), and optionally other devices forming a checkpoint. Some of the computing functionality as illustrated is provided as a cloud service (e.g., a frontend service illustrated as cloud service for a checkpoint or facility) which is virtualized from, for example, computing resources. The frontend service 320 can supported by one or more servers that are constructed/configured to support the described functionality. Those of skill in the art will appreciate that the illustration is representative of example embodiments, other components and arrangements are possible as understood by one of skill in the art and the capabilities of the components that form the system. In embodiments, the resources (hardware, software) or the functions described as performed by the cloud resource are provided in a distributed manner, such as making use of computing resources associated with or in the devices themselves (e.g., touchpoints 312) to manage operation of the collective group of devices, such as those forming a checkpoint. The server or cloud service can be localized (e.g., support multiple checkpoints in an airport or geographic region) to promote efficiency, minimize communication delay, and so forth as recognized by one of ordinary skill in the art.

In the case of the biometric information, an image capture device included in or associated with one of the included devices (e.g., touchpoint 312, cameras, scanners, e-gates) can obtain an image for use in matching with the person asserting an identity represented by the driver's license that is composed of biographic and biometric information. Example capture devices are operational to electronically obtain one or more images of an individual's fingerprint, facial features, iris, or the like that are usable to uniquely identify the person based on biometric information obtained from them.

Those of skill in the art will recognize that these and other functionally similar devices can electronically control devices that direct or otherwise control people. Example control or access devices include access control devices; "man-traps;" electronic gates or e-gates 342; electromechanical diverters 344 and so forth that are operable to direct/control the movement of individuals. In some instances, these devices are used to route individuals through one or more processes based on an output of a device performing biometric identification, e.g., a terminal, touchpoint.

For example, an e-gate 342 is communicatively coupled or integrated with a terminal configured (illustrated as a touchpoint 312) to collect biographic information and or capture biometric information. The e-gate 342 operates to control, direct, permit, stop or prevent the egress of an individual based on an outcome of the identification. This in some instances is done automatically, e.g., without human involvement (other than the person being identified) in the device outcome determination, routing, or preventing of egress. In other embodiments, an e-gate 342 directs an individual such as by moving or positioning a physical barrier, partitions, or arm(s) based on an outcome of an identification process or to direct the individual to a particular area. Those of skill in the art will appreciate that operation of an e-gate may be controlled (albeit indirectly) from the central resource when the central resource is performing biometric matching by comparing an image captured from a person with one or more references, e.g., from a proffered identification (e.g., mDL), or based on a reference from the data structure.

In an example, upon determining the person's biometric information does not match that asserted to a particular level an e-gate directs, such as by physically blocking one or more egress paths. The e-gate 342 may physically permit the individual to proceed or direct him/her if the identification results in a positive outcome, e.g., the person's biometrics matches that of the reference and the reference is associated with an identity that is permitted to continue to for example board a plane. Conversely, an access control device can prevent a person from leaving or direct him/her if the person is identified as an individual that is prohibited, i.e. identification results in a "fail." Although binary outcomes (e.g., "yes"/"no") are referenced, those of skill in the art will appreciate that a spectrum or range outcomes is possible, such as by judged by a computer implemented algorithm that detects based on one or more criteria with outcomes corresponding from two to up to "N" outcomes. Such an algorithm can be supported by the frontend service.

The frontend environment/system can include devices owned/operated by individuals that use of the system and these devices may communicate using (typically) different cellular or wireless communication technologies supported by appropriate hardware/software. These devices may join, drop, and participate in the system based on various use cases and can be included or excluded from the system in a transitory manner. For example, Maria's smartphone 314 providing her biographic information for her reservation can join the frontend environment to accomplish this task.

In some embodiments, an e-gate 342 includes technology used to collect biographic information/capture biometric information, such as may be included in an identification portion of a screening process. For example, an access control device includes a biometric information collection device supported by hardware/software. Although use of biometric collection devices, such as a touchpoint having this capability is discussed, in some examples a mobile device (e.g., a BYOD (bring your own device) smartphone) can include biometric information capture capability with appropriate security to ensure the integrity of the information. In this example, the access control device includes one or more image capture devices, readers (e.g., a barcode reader, a radio frequency identification (RFID) reader, a BLUETOOTH (Bluetooth SIG, Kirkland, Wash.) transceiver), (one or more of still image or video image) to collect biographic information (such as a token like a driver's license). Thus, an e-gate 116 can electronically read a user's driver's license by using a RFID receiver to obtain information (e.g., biographic/biometric/security information). This information can come from memory included in a chip in the driver's license or a smartphone including digital identity information (e.g., a mDL 326). In other instances, an image capture device (e.g., an optical image capture device 346) collects biographic information from that printed or otherwise embedded in an identification document. Though a touchpoint 312 is illustrated and will be discussed, those of skill in the art will appreciate a wide variety of devices (e.g., a terminal) can be implemented and configured in multiple different ways consistent with this disclosure.

As illustrated the touchpoint 312 includes a processor 328 and memory 318. An image capture device 346 (e.g., a camera) and communication unit 338 are also included. Although a single processor 328 and memory 318 are shown, multiple processors and memory can be included. A wide variety of types and combinations of memory may be employed, such as random access memory (RAM), hard disk memory, removable medium memory, and other types of computer-readable media.

As further illustrated, the touchpoint 312 includes an information module 348. The information module 348 is representative of functionality to collect, capture, analyze, compare biographic and biometric information that is supported by a combination of hardware and software implemented in computer executable form as a set of instructions. For instance, the information module 348 is a program of executable instructions that cause the processor collect/capture biographic and/or biometric information. Information can be collected directly, such as by typing in information, or captured scanning a fingerprint, iris, or an image of a person's face. As discussed above, in some embodiments, the central resource can be constructed to perform this task, such as through use of the biometric comparator 136 that can be constructed or configured to function in a substantially similar manner to the biometric comparator/biometric module 350 based on design preference, overall system design, and the like as understood by one of skill in the art.

The information module 348 can collect information indirectly. For example, a user may scan a passport or a travel document to input biographic and/or biometric information. In the foregoing example, the information module collects the information via machine readable medium such as by using a scanner to read a bar code that directs the touchpoint 312 to a source of the information or contains the information itself. In other instances, information is indirectly input by typing biographic information in a text box presented in a graphical user interface (GUI).

Scanning can comprise optical scanning (e.g., machine readable optical scanning, such as a barcode output on a display of a smart phone), magnetic scanning (e.g., reading a magnetic strip on a credit or other card), scanning a radio frequency identification (RFID) tag or chip, ultrasonic scanning, capacitance scanning (active or passive, near-infrared scanning, a combination thereof, or the like.

The information module 348 is illustrated as containing a biometric module 350 and a biographic module 352 formed of logic that, respectively, are capable of capturing biometric information and collecting biographic information for an individual. The biographic module 352 includes a biographic comparator 332 and a biographic analyzer 330 as described above in conjunction with the central resource 108, but configured to perform frontend functions including, but not limited to comparing biographic information asserted by a person with references in a gallery stored in conjunction with the frontend 310. The biometric module 350 includes a biometric comparator 336 as described in conjunction with the central resource 108.

The biometric and biographic comparators 336, 332 and the biographic analyzer 330 in the touchpoint 312 can be configured to perform frontend functions. For example, the biographic comparator in the frontend (touchpoint) is representative of hardware/software implemented as instructions that are stored in memory until used to by the processor to cause touchpoint to be configured or adapted to configured to calculate a respective degree of similarity between biographic information asserted by a person as part of identification (e.g., at the airport) and biographic information in one or more references, such as those forwarded to the frontend service to be used as a basis for biometric comparison. Asserted information may include information asserted as being the person's identity (e.g., submitting mDL, a physical identification, typed in). Degree of similarity may be based on a particular degree (e.g., 99.99%) or a threshold, e.g., a threshold or level not based on percentage.

In embodiments, the biometric module accomplishes this by inspecting the asserted biographic information and preparing a query based at least some of the biographic information (name, name, DOB) that is applied to memory associated with the frontend (e.g., memory for the touchpoint). The biographic module 352, thorough use of the biographic comparator and analyzer accesses 332, 330 memory to obtain references from the gallery provided by the central resource 108 that match the asserted biographic information (e.g., from mDL 326) and calculate an extent similarity and apply the threshold to determine whether the asserted biographic information and reference biographic information match at or above threshold, e.g., a degree.

In examples, the biographic module 352 does this by comparing the name, name, DOB asserted by the person for references that the biographic comparator calculates are similar to that from the person. Other combinations of biographic information can be use based on a variety of factors. The biographic module 352 selects those references that are sufficiently close, such as via the biographic comparator 332 and makes the relevant information available to the biometric module 350 for biometric comparison. For example, the biometric module 350 forwards the hashes from the biographically matching references in memory 318 so the biometric comparator can calculate which of the references match to a predetermined biometric threshold. Those of skill in the art will appreciate that the biographic comparator and analyzer included in the central resource can operate in a similar fashion, such as when comparing biographic information from airline reservations to references in its data structure generally consistent with the following examples.

For example, the touchpoint in response to receiving mDL indicating the person is asserting he is John Smith, Junior with a DOB of Dec. 21, 2000, calculates an at least quasi-unique identifier johnsmithjr12212000 and compares it to the reference gallery populated in touchpoint memory by the frontend service (and indirectly the central resource). The gallery for Mr. Smith for the purposes of illustration includes 25 references two of which are johnsmithjr12212000, which is ranked the highest match, and which is ranked as a slightly lower match, but second only to johnsmithjr12212000. The johnsmithII12212000 reference may indeed be a reference for John Smith, Junior with a DOB of Dec. 21, 2000 due to Mr. Smith having once use "II" in place of junior in a previous interaction. When the biometric comparator 332 analyzes the biometric information for the johnsmithjr12212000 reference and the johnsmithII12212000 reference it may electronically determine that biometric information captured from Mr. Smith matches equally or substantially equally as well both johnsmithjr12212000 reference and the johnsmithII12212000 reference. In this instance, the biometric module 350 has effectively determined that Mr. Smith is both johnsmithjr12212000 and the johnsmithII12212000 based on the calculated scores. (For completeness, biometric information from the remaining twenty-three other biographically "matching" references do not biometrically match to a predetermined threshold such as through use of the biometric comparator and as a result are excluded because they do not biometrically correspond to the biometric information from Mr. Smith during identification.) In this scenario, the touchpoint 312 electronically determined that Mr. Smith can proceed as neither of the references (johnsmithjr12212000 and johnsmithII12212000) are associated with a status (such as in the biographic information) indicating they are to be barred or prohibited.

In embodiments in which the central resource is configured to provide this function, the biometric image and or information from the image (e.g., a hash) is communicated to the central resource (that functions like a backend) for biometric matching with the central resource returning its output, e.g., proceed, prevent from proceeding, etc. In this way, the touchpoint may perform some tasks, e.g., biographic matching, while serving the central resource information to be used for biometric matching/identification. Those of skill in the art will appreciate that the frontend system, or devices within it, e.g., biometric matching based off an identification document, e.g., a physical card, from a chip in a card, from a smartphone providing an mDL, while the central resource handles matching based on references in the data structure, e.g., those identities associated with records, identities for people who have enrolled in the system.

Optionally in this and as generally applicable to other examples, the biometric comparator 336 (136 if the central resource is to perform this task) compares biometric information for Mr. Smith against a gallery of individuals that are prohibited. Presuming his biometric information (e.g., a hash of an image of his face) does not match that of any of the references in the exclusion gallery, Mr. Smith is permitted to proceed at which point an electronic gate 342 operates to open under control of the touchpoint 312 or the frontend service on behalf of the central resource.

In another example, the touchpoint 312 in response to receiving the name Robert Johnson with a DOB Mar. 29, 2006, typed via keyboard, queries memory 318 to determine that there is no reference that biographically matches robertjohnson03292006, so it creates a record and populates it into memory 318. When Mr. Johnson is ultimately identified as a juvenile with no derogatory information, the touchpoint permits him to proceed. At a later time, Mr. Johnson's legal guardian (since his is a juvenile) receives a text with a link that permits the guardian to opt-in Robert's information to the system and then the information from the identification is stored in a reference that is populated to the central resource 108 for subsequent use.

In an example for Maria Garcia DOB Mar. 24, 1977 the biographic module 352, through use of the biographic comparator and analyzer 332, 330 (132, 130 in the case of the central resource), determines that twenty (20) references biographically match Ms. Garcia. In this instance, the biographic comparator 332, 132 calculates that a twenty-first (21) reference is not a match because its biographic score is significantly lower than the first twenty. An example of this is that the calculated match scores references 1-20 (though differing) are determined by the biographic comparator 332, 132 using an applicable algorithm to be statistically similar enough to mariagarcia03241977, so they are included in the references used for biometric comparison. During comparison, the biometric comparator 336, 136 electronically analyzes a hash derived from a fingerprint image captured from Maria at the airport with respectively, hashes of the fingerprints represented in the references. In this case, the hash from Maria may match one reference (i.e., a highest biometric match value), but be sufficiently different (e.g., a non-match) with one of the biometric hashes that is associated with an individual who is barred or prohibited. In this case, Maria is permitted to proceed since there is no derogatory information for mariagarcia03241977 and she is a non-match to the individual who is to be barred, e.g., not permitted to proceed.

In another example, the biographic comparator 332, 132 compares William Jones Senior DOB Oct. 6, 1977 (williamjonessr10061977) with fifteen references populated to the frontend by central resource 108 via the frontend service 320. In this example, the biographic comparator 332, 132 determines, by calculating matching scores and then electronically checks which ones meet or exceed the threshold, that only ten references are a sufficient match to williamjonessr10061977 because unlike when he make the reservation, Mr. Jones added the suffix "senior" which permitted the comparator to eliminate five references as being biographical "non-matches." Thus, if the biometric comparator 336, 136 determines that biometric information from Mr. Jones matches to a predetermined extent corresponding information from the reference the touchpoint has successfully avoid the computational burden of analyzing the captured biometric information against the five references. Naturally, if none of the ten references are a biometric match, the biometric module 350 can analyze the remaining five. If none of the 15 references match, a variety of example scenarios can exist: the touchpoint can request addition information, the frontend service can request additional information In another example, the biographic module 352 examines the information for Mary Roberts with a date of birth of Feb. 29, 1972, in this example the biographic module determines that there are no references that biographically match. In this instance, it is due to Ms. Roberts having supplied her middle name "Roberta" as her first name and having supplied March 1st as her birthdate, when in fact it was February 29th as she was born on a leap year. The frontend service on behalf of the touchpoint 312 can communicate a request references for maryroberts02291972 from the central resource 108. In response, the central resource 108 prioritizes the request and interrupts itself (the processor) to build a gallery of references matching maryroberts02291972, which it communicates to the frontend system. Using the references, the biographic analyzer and comparator 330, 332 in conjunction with the biometric comparator 336, 136 locate matching references and identifies Ms. Roberts to an identity that is permitted to proceed, e.g., is not barred. In response the, touchpoint issue a control signal to an e-gate that opens so Ms. Roberts can pass.

In embodiments, the degree of similarity decreases with increasing difference between the first names, last names, and dates of birth. The magnitude of decrease may be larger for a comparable decrease in one piece of information in the biographic information than another. For example, a last name with one misspelled letter in one set of biographic information evaluated with a correctly spelled last name in the other set of biographic information may contribute to a decrease in the degree of similarity than a first name. This decrease may be greater than the decrease in the degree of similarity resulting from a first name, with the same number of letters as the last name, with one misspelled letter calculated with a correctly spelled first name. Thus, the degree of similarity may be weighted, in decreasing order, based on dates of birth, last names, and first names, respectively or collectively.

Additional weighting can be applied, in an embodiment, based on entry of the biographic information by the person. Comparable differences between biographic information provided by the person (asserted biographic information) and biographic information in reference, in an embodiment, contribute more to the decrease in the degree of similarity if biographic information from the person is scanned from a credential possessed by the person in biographic information scanned, rather than entered by the person via a user interface. This greater weight accorded to differences in biographic information from a credential as opposed to biographic information entered personally by the person takes into account the greater likelihood of error in the entry of biographic information via a user interface than erroneous biographic information from a scanned credential, which has likely undergone administrative review for accuracy. Errors, for example, include misspelled characters in the pieces of biographic information entered via a manual user interface or misinterpreted pieces of biographic information entered via a voice user interface.

Table I provides example similarities of biographic information as expressed as percentage based on particular scenarios of differences between pieces of biographic information from a reference and person, whether via user interface or credential. If the pieces of biographic information are identical, the degree of similarity is 100%. If there is an accent mark present in the first name in the identity record, but absent from the first name from the person, the first names are spelled with identical letters and almost identical. The degree of similarity can be lower in the first name from the person is from a credential rather than input by the person via the user interface indicating the greater weight put on differences in biographic information from a credential than the user interface. A formal first name in the identity record and a nickname derived from the formal first name are deemed substantially similar in this embodiment. Slightly less similar is a scenario with a first name in the identity record and pre-established alternative spelling in the first name from the person. In the foregoing scenarios, there is a high likelihood that the identity of the individual in the identity record is the same as the asserted identity of the person. However, scenarios where there are different words altogether for the first name and last name and a different date of birth indicate a reduces degree of similarity indicating that the identity of the individual in the identity record is likely not the same as the identity asserted by the person. The degree of similarity decreases when the different piece of biographical information is the first name, last name, and date of birth, respectively, in accordance with weighting discussed above. Though example degree of similarity are provided and may be use, those of skill in art will recognize that the information in the chart teaches principles that can be applied and modified based on design preference and implementation factors. It is the intention of this disclosure to encompass and include such variation.

by collecting information encoded into for example a barcode or by accessing a resource to collect information and/or to direct information for collection by another resource, e.g., memory 318.

In embodiments, the information module 348 is representative of hardware and a program of instructions, e.g., an application including instructions that are usable by the processor and stored in memory until accessed, e.g., launched. For example, the instructions embodying the information module are included in one or more computer-readable storage media, such as tangible media, that store the instructions in a non-transitory manner. In embodiments in which the information module 348 interacts with physical and/or software components, the information module is configured to interact via an API to access the information. In some embodiments, the central resource is constructed with an information module according to the present description for the touchpoint. The foregoing scenario can occur when the central resource is to provide the described functionality. It is to be appreciated that the touchpoint in some of these embodiments can functional as a terminal with limited functionality, e.g., a "thin device" in comparison to a touch point configured to perform biographic matching, biometric matching or a combination thereof.

TABLE I

Example Biographic Information Degree of Similarity Scenarios

| Identity Record | | | | Person | | | Degree of Similarity |
|---|---|---|---|---|---|---|---|
| First Name | Last Name | Date of Birth | Source | First Name | Last Name | Date of Birth | (%) |
| First Name | Last Name | Date of Birth | User Interface | Identical | Identical | Identical | 100 |
| First Name | Last Name | Date of Birth | Credential | Identical | Identical | Identical | 100 |
| First Name | Last Name | Date of Birth | User Interface | Accent Mark Missing | Identical | Identical | 99 |
| First Name | Last Name | Date of Birth | Credential | Accent Mark Missing | Identical | Identical | 98 |
| First Name | Last Name | Date of Birth | User Interface | Identical | Accent Mark Missing | Identical | 98 |
| First Name | Last Name | Date of Birth | Credential | Identical | Accent Mark Missing | Identical | 96 |
| First Name | Last Name | Date of Birth | User Interface | Nickname | Identical | Identical | 96 |
| First Name | Last Name | Date of Birth | Credential | Nickname | Identical | Identical | 94 |
| First Name | Last Name | Date of Birth | User Interface | Pre-Established Alternative Spelling | Identical | Identical | 93 |
| First Name | Last Name | Date of Birth | Credential | Pre-Established Alternative Spelling | Identical | Identical | 92 |
| First Name | Last Name | Date of Birth | User Interface | Different | Identical | Identical | 75 |
| First Name | Last Name | Date of Birth | Credential | Different | Identical | Identical | 70 |
| First Name | Last Name | Date of Birth | User Interface | Identical | Different | Identical | 65 |
| First Name | Last Name | Date of Birth | Credential | Identical | Different | Identical | 60 |
| First Name | Last Name | Date of Birth | User Interface | Identical | Identical | Different | 55 |
| First Name | Last Name | Date of Birth | Credential | Identical | Identical | Different | 45 |

The information module 348 can be constructed to support one or more graphical user interfaces (GUIs) that are output on a display included in touchpoint 312 for accepting user input. For example, the information module 348 includes an application program interface (API) that allows it to capture an image from an image capture device 346, e.g. a digital image camera. Example images include but are not limited to an image of a person's face, an iris image, an image of a fingerprint or multiple fingerprints.

In further examples, the information module 348 obtains information from one or more other devices that directly or indirectly capture/collect information. As illustrated, the information module 348 is configured to support a scanner In examples, the biographic module 352 accepts biographic information input into the touchpoint, e.g., user inputs, such as keyboards, touch screen displays, mice, gesture detectors, microphones enabled with voice recognition software, and the like that accepts biographic information including biographic information from for example a RFID chip, a smartphone, from a magnetic strip, or optically encoded. In some instances, the information module 348 generates a graphical user interface (GUI) 256, supported by a program of instructions, output on a display that permit an individual, e.g., the user, to enter information.

The information module 348 can include validating functionality, e.g., a script or program of instructions that validates the information, that is operable to implement rules for validating information, such as in response to entering information via a keyboard. Example information includes biographic, travel, and/or biometric information. In embodiments such as this, the validating function can be embodied as an algorithm that weighs the information to determine its validity. For example, instructions that enable the information module implements an algorithm that compares a name entered via a keyboard with that maintained in memory, e.g., memory, for a corresponding passport.

The validation rules can be used to check for inconsistencies, errors, omissions in names, addresses, flight numbers, responses to yes/no questions, and so on. Examples of validation rules include but are not limited to, a specified number of digits, a number pattern, and the like. The information module can validate biometric information by for example checking to ensure a picture of the individual's face is present, a fingerprint has been captured, an iris scan is collected, and so forth.

The information module 348 can implement biometric validation in a similar manner. For instance, the biometric module 350 is enabled with code, e.g., biometric comparator 336, 136 that checks a fingerprint to determine that all or enough of a fingerprint is present to permit matching/identification based on a captured fingerprint. In the previous example, the computer code performing the validation can analyze the fingerprint using one of several classification systems, including but not limited to, an algorithm based on the Vucetich system, the Roscher system, the Juan Vucetich system, or the Henry System. In embodiments such as these, the biometric module implements an algorithm that assesses the quality of the biometric information. For example, the biometric module includes a quality algorithm to determine if a facial image is of sufficient quality to be used for matching. In some instances, the biometric module may select from multiple images/hashes to determine which, if any, is of sufficient quality to be used.

In embodiments, validation is triggered by an event. Example events include entering text, checking a box or button, browsing to a new page or display, selecting enter or save, responsive to an event (e.g., a user entering a "mantrap"), and so on.

In some embodiments, the biometric module 352 is configured to manage biometric functions under control of the touchpoint. For example, the biometric module 350 manages operation of touchpoints' biometric activities, biometric capture devices (e.g., "standalone" cameras), and optionally that of a biometric resource, e.g., a biometric server that handles various biometric related functions on behalf of the biometric module. In examples, the biometric module 350 is configured to handle touchpoint requests for biometric information, schedule biometric identification tasks among touchpoints, integrate biometric information from multiple resources (e.g., standalone cameras), manage biometric information requests to/from the central resource, manage touchpoint biometric information collection, and so forth.

The biometric module 350 in conjunction with the biographic module 352 can be configured to include such information in merged information or in association with the merged information, e.g., linked to or as metadata to information in the merged data. Some of the functionality of the information module 348 can be at least partially provided by hardware/software included in a touchpoint, or central resource for a backend centric system, for a similar purpose and implement available biometric identification algorithms and software for identification purposes.

The biographic module 352 can include instructions for implementing validation rules for different countries, languages, information text boxes, and so on. Example validation rules can include rules for names, addresses, dates, passport numbers, flight numbers, a description of goods, personal characteristics, responses to yes/no questions, biometric information inputs, and combinations thereof. Examples of validation rules include but are not limited to, a specified number of digits, a number pattern, and the like. The biometric module, if it is performing this role, can include a result table (stored in memory) that is configured to store validation records. Validation records in embodiments include data associated validation errors, successes, information correction (e.g., correction of a city name), and the like for an event that triggers validation. Thus, as text is entered, the data validation logic can validate each entered character for an event, e.g., key press, submitting or storing information. The system (e.g., touchpoint and/or central resource) can maintain the validation records for a predetermined period of time, until occurrence of an event, and the like events. It will be appreciated that this information in the validation record may be included in a name record and/or an indication (such as a score) can be included. In the latter situation, a score may indicate the person or persons are attempting to provide false or misleading information. What threshold score is to be achieved to pass validation can be changed manually, e.g., by a system supervisor, or dynamically based on a variety of factors, including but not limited to, location, other users' errors, and so forth.

Although validation has been described in combination with the biographic module in the touchpoint, in other embodiments the central resource performs this functionality, or a more robust/different form of validation/checking or it can be performed in a distributive manner. In further embodiments, validation is performed by a dedicated module on the touchpoint. In the previous example, an API is used to allow the information and verification modules to interact.

As illustrated, the touchpoint includes an image capture device, e.g., a camera, although other devices, scanners (e.g., an iris scanner), detectors can be included with or used in place of a camera. The image capture device 346 is operable to capture biometric information. For example, a user implements a camera in the touchpoint to capture an image of his/her face for inclusion with his/her biographical information. Other biometric information includes, a fingerprint image, an iris scan, a body scan and/or actions associated with behavioral traits, voice pattern, and the like biologically identifiable traits. In the picture situation, the image is embodied in a file for inclusion in a reference stored in conjunction with the central resource. The image may be contained in a variety of file formats including, but not limited to, a jpeg file, a tiff file, a gif file, a pdf file, and so forth.

Additionally, the touchpoint 312 can accept changes to biographic information that is promulgated back to the central resource 108 at a predetermined time or on the occurrence of an event, e.g., availability of resources. For example, in response to submission of an address change, but for an individual whose information otherwise meets a predetermined threshold, the updated information for the individual and his/her associated items is communicated to the central resource for inclusion in the database. In another example, an individual's biometric information (facial image) or facial recognition information is automatically added to the record of the central resource to better identify a passport held as he/she ages for the period of time his/her passport is valid.

The touchpoint of FIG. 3 also includes a communication unit 338. The communication unit represents hardware and/or software (e.g., firmware) for communicating with other devices/components in the system, external resources, such as other systems, and the like. The communication module can implement a variety of communication technologies including, but not limited to, wired, wireless communications and combinations thereof. Wired embodiments include communication systems implement Internet protocols, e.g., transmission control protocol (TCP) over internet protocol (IP), fixed or hardwired telephony communications.

In embodiments, the frontend service 320 or the touchpoint 312 can dynamically change a threshold implemented by the system or one or more individual devices used for identification. Dynamic thresholding can be done on an individual device basis, a group of devices configured to operate together, based on a facility (e.g., a port of entry); or on regional or national criterion. Such a dynamic thresholding permits centralized adjustment of how close a match is to be to qualify to a match. In some examples this is done in a manner that obfuscates what is occurring (e.g., variation in device threshold level) to promote security. For example, instead of statically assigning a particular threshold, the frontend service can vary the threshold based on design preference, throughput, and the like as understood by one of skill in the art.

Having described example environment, systems, devices and modules constructed of (in some instances) hardware/software, example methods will be described in further detail. Those of skill in the art will appreciate that the described methods, steps, approaches and techniques can be implemented by (but are not necessarily restricted to) the above systems, devices and modules. In some embodiments, the methods, steps, approaches and techniques can make use of the described hardware and/or software as contemplated by one of ordinary skill in the art. Although the sample methods are described in relation to particular tasks and corresponding environments. Examples include, but are not limited to, airline screening, driver's license testing, educational testing, entertainment (sports, concert) safety screening or identification, border crossing.

Example Methods

The following discussion describes procedures that may be implemented using the previously described systems, techniques, approaches, and devices, although the described procedures are not restricted to that previously described. In embodiments, one or more of the steps are implemented in computer implemented algorithm. Aspects of the procedures may be implemented in hardware, firmware, or software, or a combination thereof. The procedures are shown as a set of blocks that specify operations performed by one or more electronic devices and are not necessarily limited to the orders shown for performing the operations by the respective blocks. In portions of the following discussion, reference will be made to the environments, systems, devices, modules, applications, algorithms, approaches, and techniques described above. While some block/decisions may be captioned as "optional", there is to be no negative inference with respect blocks/decisions that are not denominated as "optional", i.e. blocks/decisions are not "mandatory." In accordance with some embodiments, information is stored in memory (at least temporarily) during performance of the methods for a variety of reasons. Example rationales include, but are not limited to, data processing convenience, communication convenience, permit batch validation/review, records maintenance, and so on, and combinations thereof.

Figure 4:
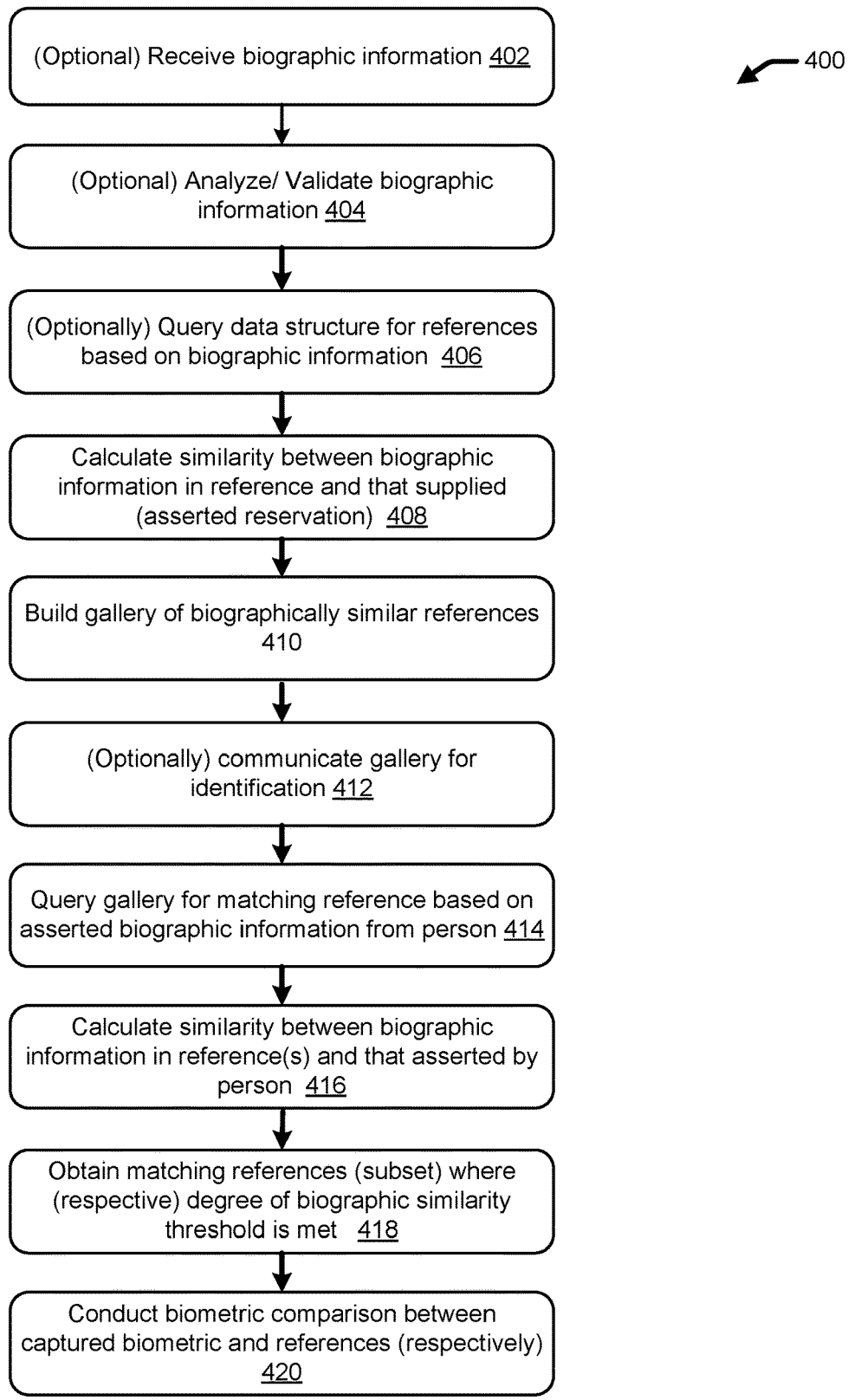
FIG. 4 is a flow diagram that illustrates example methods for biographically disambiguating references for use in biometric identification.

FIG. 4 is a flow diagram 400 that illustrates aspects of steps in accordance with methods of the present disclosure. While an air travel scenario is discussed in conjunction with the method those of skill in the art will appreciate that the steps can be modified, rearranged, omitted, based on design preference, available resources, and so forth consistent with the principles of this disclosure.

Block 402 is representative of receiving biographic and, perhaps biometric, information from a person who is anticipated to undergo identification. For example, a person wishing to travel by air submits a travel reservations with biographic information, e.g., name, name, date of birth (DOB). In another example receiving biographic information is obtained from a person submitting a visa, registering for a test, submitting a customs declaration and the like. Analyzing/validating (Block 404) includes checking the received biographic information for errors (typos), omitted data, and the like to ensure to the extent possible that the biographic information is well-formed, valid, authentic, biographic information to for instance minimize resource burden and so forth from ill-formed or inaccurate information. A data structure used to maintain a plurality of references (identities) made of respectively biographic and/or biometric information for individuals is queried (Block 406) base on the biographic information for references that correspond to that asserted in the received biographic information, e.g., travel reservation. Calculating a respective similarity between the received (asserted in reservation for instance) biographic information and comparing it to biographic information in the respective reference is illustrated as block 408. This can include electronically determining which of the references meets a predetermined biographic threshold. Based on the similarity determination, a gallery of references that meet the threshold can be built (Block 410). The gallery can represent references that are individually composed of biographic and biometric information in which the biographic information matches that which was asserted in the received information. Those of skill in the art will appreciate that some references may not include biometric or only include some biometric information. The gallery can be communicated (Block 412) to for example a device or system that is predicted or anticipated to conduct identification on the relevant person for a frontend centric identification approach. The foregoing steps may performed in scenarios in which information about people who will seek identification are known to some degree before identification. Other examples exist in which those seeking identification is not known.

Bock 414 is representative of querying a gallery of references based on information received from a person that asserts an identity, e.g., biographically asserts. For example, upon reaching a touchpoint included in a TSA checkpoint a person scans his/her driver's license to inform the touchpoint of who he/or she is. In response, a gallery of references is questioned to obtain those references that are generally similar to the asserted biographic information. Those of skill in the art will appreciate that the querying of block 414 may include obtaining references from a data structure such as that of the central resource if a gallery has not been built, such as if the person is a "walk-up."

A calculation is performed (Block 416) of the biographic similarity between the asserted identity (e.g., the biographic information included in for example an identification document (ID)) by a person seeking identification and that in the references from the query.

References that match the asserted biographic information are obtained (Block 418). The references represent identities (biographic/biometric) information that match the asserted biographic information to a sufficient extent or degree. For example, the references in the biographically matched gallery meet a predefined threshold of sameness such that they respectively should be considered for identification. Those of skill in the art will appreciate that the identification of and obtaining of biographically (generally) similar references can iterate based on outcome. For example, if there is not a discernable difference in biometric matching (e.g., there is no quantitative difference in the biometric matching values) a device performing the method can request additional generally similar references until the matching value decreases to a non-match. This may be done to avoid deep fake situations. Naturally, a device performing the method is programmed to resolve the situation which among other options may include providing one or more an electronic alert, e.g., a text alert of this situation.

In Step 420, a biometric analysis is conducted of the respective biometric information in references included in the subset (e.g., gallery based on the match of 418) and biometric information of the person. For example, a hash derived from an image captured of the person, contemporaneous with the time of identification, is electronically compared to respectively the hashes from the references included in the gallery to determine whether or not and/or to what extent the references biometrically match the captured biometric information.

Optionally, an exclusion identification can be performed to compare the captured biometric information to one or more references of individuals that are to be stopped, barred, or prohibited.

CONCLUSION

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associate with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware and/or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not be taken as limiting or restricting the systems, techniques, approaches, methods, devices to those appearing in any particular section. Rather, the teachings and disclosures herein can be combined, rearranged, with other portions of this disclosure and the knowledge of one of ordinary skill in the art. It is the intention of this disclosure to encompass and include such variation.

What is claimed is:

1. A system comprising a computer comprising:
a processing system having a hardware processor configured to perform a predefined set of basic operations by loading corresponding ones of a predefined native instruction set of codes, the predefined native instruction set of codes constituting a set of instructions selectable for execution by the hardware processor;
a memory accessible to the processing system;
a user interface controller under control of the processing system;

user interface logic, stored in the memory, comprising a sequence of instructions selected from the predefined native instruction set of codes of the hardware processor, adapted to operate with the processing system and the user interface controller to implement a user interface adapted to obtain, from a person, proffered biographic information as an asserted identity of the person;

a biometric capture system, including a sensor configured to obtain current biometric information of the person, under control of the processing system;

a communication system, under control of the processing system, adapted to transmit a query, based on the proffered biographic information, and to receive corresponding identity records of individuals;

biographic information comparator logic, stored in the memory, comprising a respective sequence of instructions selected from the predefined native instruction set of codes of the hardware processor, adapted to calculate a respective measure of biographic similarity between the proffered biographic information and saved biographic information received in one of the corresponding identity records;

biometric information comparator logic, stored in the memory, comprising a respective sequence of instructions selected from the predefined native instruction set of codes of the hardware processor, adapted to compute a respective measure of biometric similarity for only ones of the corresponding identity records where the respective measure of biographic similarity exceeds a predetermined biographic similarity threshold;

the processing system being further configured to output an access control signal when the respective measure of biometric similarity exceeds a predetermined biometric similarity threshold; and access control circuitry, responsive to the access control signal and configured to control a state of an access control device.

2. The system of claim 1, wherein the biographic similarity is based on a comparison of first names, last names, and dates of birth.

3. The system of claim 2, wherein the biographic information comparator logic is adapted to calculate the respective measure of biographic similarity as exceeding the predetermined biographic similarity threshold when the last names are identical, the dates of birth are identical, and the first names are either identical or in a set of predetermined nickname variants.

4. The system of claim 2, wherein the biographic information comparator logic is adapted to calculate the respective measure of biographic similarity as exceeding the predetermined biographic similarity threshold when the last names are identical, the dates of birth are identical, and the first names are either identical or in a set of predetermined alternative spellings.

5. The system of claim 1, comprising an electronic access control device configured to perform a pre-programmed function according to a result output from the biometric information comparator logic.

6. The system of claim 1, wherein the biographic information comparator logic is configured to compare first names and last names, and dates of birth, respectively, represented in the proffered biographic information from the person and saved biographic information in an identity record included in the identity records.

7. The system of claim 1, wherein the biographic information comparator logic is configured to weight the measure of biographic similarity in decreasing order, based on data of birth, last name, and first name.

8. The system of claim 1, wherein the biographic information comparator logic is configured to weight a derived nickname as substantially similar but not equal to an associated formal name.

9. The system of claim 8, wherein substantially similar weight is 92%-98%.

10. The system of claim 6, wherein the biographic information comparator logic is configured to weight a first name in the proffered biographic information as substantially similar to the first name in the saved biographic information if when the first name in the proffered biographic information is a pre-established alternative spelling of the first name in the saved biographic information, and the date of birth and last name match that of the identity record.

11. The system of claim 7, wherein the measure of biographic similarity is weighted higher when the proffered biographic information is obtained from a credential than from the person via a user activatable region of a user interface.

12. The system of claim 1, wherein: the biometric capture system is configured to populate at least one identity record of the identity records with the biometric information of the person when: the at least one identity record does not include biometric information that corresponds to the current biometric information; and the saved biographic information of the at least one identity record has the highest respective degree of similarity to the biographic information from the person.

13. The system of claim 12, wherein either or both of the current biometric information and the prior biometric information comprises a fingerprint image, a facial image, or an iris scan.

14. An access control method comprising:
performing a predefined set of basic operations with a processing system having a hardware processor by loading corresponding ones of a predefined native instruction set of codes, the predefined native instruction set of codes constituting a set of instructions selectable for execution by the hardware processor; a memory accessible to the processing system;

controlling a user interface controller with the processing system;

obtaining from a person, proffered biographic information as an asserted identity of the person by implementing a user interface with a user interface logic stored in memory; said interface logic comprising a sequence of instructions selected from the predefined native instruction set of codes of the hardware processor;

obtaining current biometric information of the person with a biometric capture system containing a sensor;

transmitting a query, based on the proffered biographic information, with a communication system under control of the processing system;

receiving corresponding identity records of individuals with the communication system under control of the processing system;

calculating a respective measure of biographic similarity between the proffered biographic information and saved biographic information received in one of the corresponding identity records with a biographic information comparator logic, stored in the memory, said biographic information comparator logic comprising a respective sequence of instructions selected from the predefined native instruction set of codes of the hardware processor;

computing a respective measure of biometric similarity for only ones of the corresponding identity records where the respective measure of biographic similarity exceeds a predetermined biographic similarity threshold; wherein the step of computing is performed by a biometric information comparator logic, stored in the memory, comprising a respective sequence of instructions selected from the predefined native instruction set of codes of the hardware processor;

outputting an access control signal when the respective measure of biometric similarity exceeds a predetermined biometric similarity threshold; and controlling a state of an access control device responsive to the access control signal.

15. The access control method of claim 14, comprising sensing biometric data of the person using the sensor.

16. The access control method of claim 14, further comprising causing an electronic access control device to perform a pre-programmed function according to a result output from the biometric information comparator logic.

17. The access control method of claim 14, wherein the step of calculating the respective measure of similarity further comprises comparing first names and last names, and dates of birth, respectively, represented in the proffered biographic information from the person and saved biographic information in an identity record included in the identity records.

18. The access control method of claim 17, comprising the step of weighting the measure of biographic similarity in decreasing order, based on data of birth, last name, and first name.

19. The access control method of claim 17, comprising the step of weighting a derived nickname as substantially similar but not equal to an associated formal name.

20. The access control method of claim 19, wherein substantially similar weight is from 92% and 98%.

21. The access control method of claim 17, comprising the step of weighting a first name in the proffered biographic information as substantially similar to the first name in the saved biographic information if the first name in the proffered biographic information is a pre-established alternative spelling of the first name in the saved biographic information, and the date of birth and last name match that of the identity record.

22. The access control method of claim 21, wherein the substantially similar is from 92% and 98%.

23. The access control method of claim 15, comprising the step of weighting the measure of similarity higher when the proffered biographic information is obtained from a credential than from the person via a user activatable region of a user interface.

24. The access control method of claim 15, comprising the steps of: populating at least one identity record of the identity records with the biometric information of the person when: the at least one identity record does not include biometric information that corresponds to the current biometric information; and the saved biographic information of the at least one identity record has the highest measure of similarity to the biographic information from the person.

25. The access control method of claim 15, wherein an individual, to whom one of the identity records corresponds, is expected to access a facility within a pre-established period of time.

26. The access control method of claim 15, wherein either or both of the current biometric information and the prior biometric information comprises a fingerprint image, a facial image, or an iris scan.

27. The access control method of claim 26, further comprising populating the at least one identity record with the biometric information obtained of the person when:
   the prior biometric information is missing one or more of a fingerprint image, a facial image or an iris scan included in the current biometric information; and
   the prior biometric information has the highest respective measure of similarity to the current biometric information.

28. The access control method of claim 26, wherein conducting a biometric analysis comprises calculating a measure of similarity of information derived from the current biometric information and information derived from the prior biometric information.

29. The access control method of claim 26, wherein either or both of the current biometric information and the prior biometric information is a digital representation of the fingerprint image, the facial image, or the iris scan.

* * * * *